(12) United States Patent
Kumakura et al.

(10) Patent No.: US 11,271,203 B2
(45) Date of Patent: Mar. 8, 2022

(54) POSITIVE ELECTRODE MATERIAL FOR RECHARGEABLE LITHIUM ION BATTERIES AND METHODS OF MAKING THEREOF

(71) Applicants: UMICORE, Brussels (BE); UMICORE KOREA LTD., Cheonan-si (KR)

(72) Inventors: Shinichi Kumakura, Cheonan-si (KR); Jens Paulsen, Cheonan-si (KR); TaeHyeon Yang, Cheonan-si (KR); HyeJeong Yang, Cheonan-si (KR); Song-Yi Han, Cheonan-si (KR)

(73) Assignees: Umicore, Brussels (BE); Umicore Korea Ltd., Cheonan-si (KR)

( * ) Notice: Subject to any disclaimer, the term of this patent is extended or adjusted under 35 U.S.C. 154(b) by 0 days.

(21) Appl. No.: 16/955,906

(22) PCT Filed: Dec. 19, 2018

(86) PCT No.: PCT/IB2018/060326
§ 371 (c)(1),
(2) Date: Jun. 19, 2020

(87) PCT Pub. No.: WO2019/123306
PCT Pub. Date: Jun. 27, 2019

(65) Prior Publication Data
US 2020/0381727 A1  Dec. 3, 2020

Related U.S. Application Data

(60) Provisional application No. 62/649,646, filed on Mar. 29, 2018, provisional application No. 62/637,752, filed on Mar. 2, 2018.

(30) Foreign Application Priority Data

Dec. 22, 2017 (EP) ..................................... 17209955
Jun. 5, 2018 (EP) ..................................... 18175873

(Continued)

(51) Int. Cl.
*H01M 4/525* (2010.01)
*H01M 10/0525* (2010.01)
(Continued)

(52) U.S. Cl.
CPC ............ *H01M 4/525* (2013.01); *C01G 53/42* (2013.01); *C01G 53/50* (2013.01);
(Continued)

(58) Field of Classification Search
CPC ..... C01G 53/42; C01G 53/50; H01M 4/0402; H01M 4/04; H01M 4/505; H01M 10/0525;
(Continued)

(56) References Cited

U.S. PATENT DOCUMENTS

2004/0023113 A1  2/2004  Suhara et al.
2006/0257745 A1  11/2006  Choi et al.
(Continued)

FOREIGN PATENT DOCUMENTS

EP  2405511 A2  1/2012
JP  11079751 A  3/1999
(Continued)

OTHER PUBLICATIONS

JP 2005026218 ESPACENET Abstract Jan. 2005.*
(Continued)

*Primary Examiner* — Anca Eoff
*Assistant Examiner* — Aaron J Greso
(74) *Attorney, Agent, or Firm* — NK Patent Law

(57) ABSTRACT

A method for preparing a N(M)C-based positive electrode materials according to the present invention comprises the following steps: —Precipitation of a metal (at least Ni— and Co—, preferably comprising Mn—) bearing precursor (MBP), —Fractionation of the MBP in a first (A) fraction and at least one second (B) fraction, —Lithiation of each of the first and second fraction, wherein the A fraction is converted into a first polycrystalline lithium transition metal oxide-based powder and the B fraction(s) is(are) converted into a second lithium transition metal oxide-based powder (Continued)

and, and —Mixing the first and second monolithic lithium transition metal oxide-based powder to obtain the N(M)C-based positive electrode material.

14 Claims, 4 Drawing Sheets

(30) Foreign Application Priority Data

| | | |
|---|---|---|
| Jun. 5, 2018 | (EP) | 18175897 |
| Jul. 9, 2018 | (EP) | 18182354 |
| Aug. 22, 2018 | (EP) | 18190220 |

(51) Int. Cl.
    *C01G 53/00*     (2006.01)
    *H01M 4/04*     (2006.01)
    *H01M 4/505*     (2010.01)
    *H01M 4/02*     (2006.01)

(52) U.S. Cl.
    CPC .......... *H01M 4/0402* (2013.01); *H01M 4/505* (2013.01); *H01M 10/0525* (2013.01); *C01P 2002/52* (2013.01); *C01P 2004/03* (2013.01); *C01P 2004/50* (2013.01); *C01P 2004/61* (2013.01); *C01P 2006/40* (2013.01); *H01M 2004/028* (2013.01)

(58) Field of Classification Search
    CPC ............ H01M 4/525; H01M 2004/028; C01P 2002/52; C01P 2004/50; C01P 2004/61; C01P 2006/40
    See application file for complete search history.

(56) References Cited

U.S. PATENT DOCUMENTS

| | | | |
|---|---|---|---|
| 2008/0076027 A1* | 3/2008 | Saito | H01M 4/525 429/231.1 |
| 2009/0148772 A1 | 6/2009 | Kawasato et al. | |
| 2013/0037742 A1 | 2/2013 | Oda et al. | |
| 2014/0030588 A1 | 1/2014 | Hong et al. | |
| 2014/0106212 A1 | 4/2014 | Choi et al. | |
| 2014/0212759 A1 | 7/2014 | Blangero et al. | |
| 2014/0377659 A1* | 12/2014 | Oljaca | H01M 4/502 429/221 |
| 2017/0309894 A1 | 10/2017 | Hu et al. | |
| 2017/0309902 A1 | 10/2017 | Jo et al. | |
| 2018/0241036 A1 | 8/2018 | Jo et al. | |
| 2018/0351174 A1 | 12/2018 | Paulsen et al. | |
| 2019/0221830 A1 | 7/2019 | Do et al. | |

FOREIGN PATENT DOCUMENTS

| | | | |
|---|---|---|---|
| JP | 2005-026218 | * | 1/2005 |
| JP | 2005332713 | A | 12/2005 |
| JP | 2006054159 | A | 2/2006 |
| JP | 2006228733 | A | 8/2006 |
| JP | 2014523840 | A | 9/2014 |
| JP | 2016162748 | A | 9/2016 |
| JP | 2017536654 | A | 12/2017 |
| KR | 1020170063373 | A | 6/2017 |
| WO | 2007108611 | A1 | 9/2007 |
| WO | 2008084679 | A1 | 7/2008 |
| WO | 2017013520 | A1 | 1/2017 |
| WO | 2017042654 | A1 | 3/2017 |
| WO | 2017042655 | A1 | 3/2017 |

OTHER PUBLICATIONS

JP 2005026218 ESPACENET English Machine Translation Jan. 2005 printed Apr. 12, 2021.*

ISA/KR; International Search Report and Written Opinion for International Patent Application No. PCT/IB2018/060326 dated Apr. 29, 2019, 9 pages.

EPO, Supplementary European Search Report for corresponding European Patent Application No. 19761326, dated Dec. 20, 2021, 2 pages.

* cited by examiner

POSITIVE ELECTRODE MATERIAL FOR RECHARGEABLE LITHIUM ION BATTERIES AND METHODS OF MAKING THEREOF

CROSS-REFERENCE TO RELATED APPLICATIONS

This application is a U.S. National Stage application of International Patent Application No. PCT/IB2018/060326, filed on Dec. 19, 2018, which claims the benefit of European Patent Application No. 18190220.6, filed on Aug. 22, 2018, and the benefit of European Patent Application No. 18182354.3, filed on Jul. 9, 2018, and the benefit of European Patent Application No. 18175897.0, filed on Jun. 5, 2018, and the benefit of European Patent Application No. 18175873.1, filed on Jun. 5, 2018, and the benefit of U.S. Provisional Patent Application No. 62/649,646, filed on Mar. 29, 2018, and the benefit of U.S. Provisional Patent Application No. 62/637,752, filed on Mar. 2, 2018, and the benefit of European Patent Application No. 17209955.8, filed on Dec. 22, 2017.

TECHNICAL FIELD AND BACKGROUND

This invention relates to a process for manufacturing a Lithium Nickel (Manganese) Cobalt Oxide [hereafter referred to as "N(M)C"] based positive electrode materials for a liquid electrolyte-based secondary battery having a high volumetric energy density and destined to be used in batteries suitable for electric vehicles (EVs) applications.

A higher volumetric energy density positive electrode material for EVs applications can be reached by designing a cathode material having a high gravimetric energy density of at least 600 Wh/kg at relatively low voltage (for instance, at a voltage <4.10 V) and/or having a high press density. A high press density is met by designing cathode material comprising closely packed particles having a low brittleness. For achieving high a gravimetric energy density, a high Ni content (i.e. a Ni content of ≥60 mol % of the transition metal content in the N(M)C material) is desired while targeting a high electrode density would require that the N(M)C material has a pressed density of at least 3.4 g/cm$^3$.

Indeed, the volumetric energy density of positive electrode materials can be calculated by multiplying the gravimetric energy density (Wh/kg) and the electrode density (g/cm$^3$). Therefore, the higher the electrode density, the more powder is available into a given volume of a battery, increasing thus the available energy in said battery. Moreover, provided that the electrode density correlates well with the pressed powder density of positive electrode materials, cathode materials having a high pressed powder density are desired.

Another reason why a high pressed density is desirable can be found in the way a positive electrode is prepared. For making a positive electrode from a cathode material, a roll pressing step (called electrode calendering step) is applied to compact the components in the electrode including the positive electrode material. Provided that the particles of a N(M)C positive electrode material tend to break during roll pressing step, leading to an increase of the particles surface area leading to undesired side reactions between the electrolyte and the positive electrode material can take place. In addition, the compacted electrode resulting from the rolling step leads to a depletion of the liquid electrolyte limiting the fast diffusion of lithium ions in the electrolyte and resulting in a poor rate performance.

It is therefore desired that a N(M)C positive electrode material, in particular N(M)C material comprising a content of Ni, has particles that have a relatively low brittleness.

The brittleness of a powderous compound can be quantified by several methods. One of methods is described in US2004/0023113A1, page 6, Example 1, paragraph 60, where the change of PSD after applying certain pressure is used to quantify the brittleness. The increase of BET after applying certain pressure can be used as another criterion.

As mentioned above, a high Ni content in a N(M)C cathode material leads to an increase of the (relative) capacity of the positive electrode material, resulting in higher gravimetric energy density. However, the higher the Ni content of the positive electrode material, the more brittle it is. Therefore, any attempt to achieve a high electrode density, in particular based from high Ni content cathode materials is more challenging than when using low Ni materials (i.e. materials having a Ni content of <60 mol % of the transition metal content). Such an achievement would require a new method for manufacturing the desired N(M)C material, which cannot be reached in an easy and affordable manner with the current production methods.

A well-known way to increase the volumetric powder density is applying a concept of bimodal particle size distribution (PSD) in positive electrode materials, which is widely used in commercial batteries.

This concept consists in filling voids, created by packing of big particles (generally having a D50 of >10 μm), with small particles (having a D50 of </=5 μm).

There are two conventional methods to prepare such products. A first option is, to mix two final positive electrode materials which have different particle size distributions. In a second option, two metal bearing precursors can be mixed before sintering, then they are sintered together. However, these methods have drawbacks. The benefit of the volumetric density might be limited by the naturally broad PSD of big and small particles. Additionally, the high surface area contribution induced by small particles of the positive electrode material resulting from one of these methods is not desirable since more side reactions can be expected in a battery. Finally, it is required to prepare two different metal bearing precursors, which makes the implementation of each of these methods expensive.

It is therefore an object of the present invention to provide a method of manufacturing a N(M)C cathode material suitable for EVs applications having a high volumetric energy density together with a low brittleness, which is advantageous in that said method is easier to implement and is therefore cheaper than the above-mentioned methods.

SUMMARY OF THE INVENTION

This objective is achieved by providing a manufacturing process according to claim 1 wherein a precursor of such a material is firstly fractionated in a first fraction and at least one fraction, the first fraction being converted into a first compound comprising polycrystalline particles, the at least one second fraction being converted in a second compound comprising particles having a monolithic crystal structure, each of the first and at least one second fraction having a suitable PSD and being mixed together so as to obtain a N(M)C cathode material having a high volumetric capacity resulting from a higher energy density that can be achieved because said N(M)C material comprises particles having a low brittleness.

The present invention concerns the following Embodiments 1-13:

Embodiment 1

A method for preparing a powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_cMe'_dCo_eK_f$, wherein $0.30 \leq c \leq 0.92$ $0.00 \leq d \leq 0.40$, $0.05 \leq e \leq 0.40$ and $0 \leq f \leq 0.05$, with Me' being either one or both of Mn or Al, and with K being a dopant different from Me', the method comprising the steps of:
providing a Ni— and Co— bearing precursor of said powderous positive electrode active materials,
fractionating said Ni— and Co— bearing precursor so as to obtain a first fraction of precursor particles being having a span inferior to 1.0 and having a D50 superior equal to 10 μm and inferior or equal to 20 μm, and at least one second fraction of precursor particles, said first and at least one second fractions of precursor particles being split off from said Ni— and Co— bearing precursor, said first fraction being at least 40 wt % and at most 85 wt % with respect to the total weight of the Ni— and Co— bearing precursor,
said fractionating step being followed by the steps of:
converting said first fraction of precursor particles into a first compound powder comprising polycrystalline particles having a general formula $Li_{1+a}M'_{1-a}O_2$, wherein $-0.03 \leq a \leq 0.10$, and $M'=Ni_xM''_yCo_zE_d$, wherein $0.30 \leq x \leq 0.92$ $0.00 \leq y \leq 0.40$, $0.05 \leq z \leq 0.40$ and $0 \leq d \leq 0.05$, with M" being either one or both of Mn or Al, and with E being a dopant different from M", said first compound particles having a span inferior to 1.0 and having a D50 superior equal to 10 μm and inferior or equal to 20 μm,
converting said at least one second fraction of precursor particles into a second compound powder comprising single crystal monolithic particles having a general formula $Li_{1+b}N'_{1-b}O_2$, wherein $-0.03 \leq b \leq 0.10$, and $N'=Ni_{x'}N''_{y'}Co_{z'}E'_{d'}$, wherein $0.30 \leq x' \leq 0.92$ $0.00 \leq y' \leq 0.40$, $0.05 \leq z' \leq 0.40$ and $0 \leq d' \leq 0.05$, with N" being either one or both of Mn or Al, and with E' being a dopant different from N", said monolithic particles having a D50 superior or equal to 2 μm and inferior or equal to 8 μm, and
mixing said first compound powder and said second compound powder so as to form the powderous positive electrode active material, wherein the content of the second compound is superior or equal to 15 wt % and inferior or equal to 60 wt % with respect to the total weight of the powderous positive electrode active material, and wherein the content of the first compound is superior or equal to 40 wt % and inferior or equal to 85 wt % with respect to the total weight of the powderous positive electrode active material.

Preferably, the sum of the first and second fraction reaches 100 wt % with respect to the total weight of said powderous positive electrode active material.

Preferably, said Embodiment 1 is a method for manufacturing a powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_cMe'_dCo_eK_f$, wherein $0.30 \leq c \leq 0.92$ $0.00 \leq d \leq 0.40$, $0.05 \leq e \leq 0.40$ and $0 \leq f \leq 0.05$, with Me' being either one or both of Mn or Al, and with K being a dopant different from Me'.

Embodiment 2

The method according to Embodiment 1, wherein said Ni— and Co— bearing precursor is fractioned so as to obtain one second fraction of precursor particles having a D50 superior to the D50 of the first fraction of precursor particles.

Embodiment 3

The method according to Embodiment 1, wherein said at least one second fraction of Ni— and Co— bearing precursor particles is further fractionated into at least two subfractions, each of the at least two sub-fractions having a D50 superior to the D50 of the first fraction of precursor particles.

Embodiment 4

The method according to any one of Embodiments 1 or 3, wherein said Ni— and Co— bearing precursor has particles having a D50 superior to 8 μm, and inferior or equal to 25 μm.

Embodiment 5

The method according to any of Embodiments 1 to 4, wherein the step of converting said at least one second fraction comprising said Ni— and Co— bearing precursor particles into said second compound comprises the steps of:
providing a mixture comprising said at least one second fraction of Ni— and Co— bearing precursor particles and a Li bearing precursor,
subjecting the mixture to a multiple step sintering process whereby in the final sintering step a sintered lithiated intermediate material is obtained comprising agglomerated primary particles having a primary particle size distribution with a D50 between 2.0 and 8.0 μm,
subjecting the lithiated intermediate material to a wet-milling step whereby the agglomerated primary particles are deagglomerated and a slurry comprising deagglomerated primary particles is obtained, and
separating the deagglomerated primary particles from the slurry, preferably followed by a step of drying the deagglomerated primary particles.

Preferably, in the mixture comprising a Ni— and Co— bearing precursor and a Li bearing precursor the Li to transition metal ratio is between 0.65 and 0.95, and the multiple step sintering process comprises the following additional steps:
a first sintering step in an oxidizing atmosphere at a temperature between 650 and 850° C., for a time between ⅓ and 15 hours, thereby obtaining a lithium deficient precursor powder,
mixing the lithium deficient precursor powder with either one of LiOH, Li2O and LiOH.H2O, thereby obtaining a second mixture whereby the mixture has a Li to transition metal ratio is between 0.95 and 1.10, and
sintering the second mixture in an oxidizing atmosphere at a temperature between 800 and 1000° C., for a time between 6 and 36 hours.

After the wet ball milling, a slurry of milled single crystalline primary particle is obtained. The PSD can be directly measured from the slurry. The D50 is at least 2 μm and at most 8 µm, which is basically the same as the primary particle size of sintered agglomerated particle after the solid-state reaction. Preferably, the span of said second compound is low for the second with a typical value of 0.9-1.3.

The process according to Embodiment 5 allows to use mixed transition metal precursors of a variety of shapes. There is no need for "shaped" precursors meaning that the shape and size of a precursor is resembling the preferred shape and size of the final positive electrode material. Possible mixed transition metal precursors are mixed transition metal hydroxides, carbonates, oxides or oxy-hydroxides.

Moreover, the wet ball milling process of Embodiment 5 can reduce the quantity of surface impurities of positive electrode materials. The presence of large quantities of surface impurities like unreacted LiOH or $Li_2CO_3$—also referred to as surface bases—is an issue for the preparation of NMC with higher Ni.

Finally, the wet milling allows to achieve an in-situ surface coating during milling without applying a separate process step. If the positive electrode material has a Ni content (Ni/M') of higher than or equal to 0.6, the positive electrode material has an inherent surface base content. In solvents like water, some Li is extracted from the positive electrode material—possibly by ion exchange between Li and protons—resulting in an increase of the solutions pH. The presence of a basic solution can be utilized to precipitate hydroxides onto the surface of positive electrode materials.

Embodiment 6

A method for preparing a powderous positive electrode active material for secondary lithium ion batteries, said powderous positive electrode active material comprising particles having a general formula $Li_{1+k}Me_{1-k}O_2$, wherein $-0.03 \le k \le 0.10$, and $Me=Ni_cMe'_dCo_eK_f$, wherein $0.30 \le c \le 0.92$ $0.00 \le d \le 0.40$, $0.05 \le e \le 0.40$ and $0 \le f \le 0.05$, with Me' being either one or both of Mn or Al, and with K being a dopant different from Me', the method comprising the steps of:
providing a Ni— and Co— bearing precursor of said powderous positive electrode active materials,
mixing said Ni— and Co— bearing precursor with a first Li bearing precursor so as to obtain a first mixture having a Li/M' molar ratio superior or equal to 0.70 and inferior or equal to 0.95, wherein M' comprises at least Co and Ni, and sintering said first mixture at a temperature superior or equal to 700° C. and inferior or equal to 950° C., so as to obtain a lithium deficient intermediate compound powder,
fractionating said lithium deficient intermediate compound powder so as to obtain a first fraction of lithium deficient intermediate compound particles having a span inferior to 1.0 and having a D50 superior equal to 10 µm and inferior or equal to 20 µm, and at least one second fraction lithium deficient intermediate compound particles, said first and at least one second fraction being split off from said lithium deficient intermediate compound powder, said fractionating step being followed by the steps of:
converting said first fraction of lithium deficient intermediate compound particles into a first compound comprising polycrystalline particles having a general formula $Li_{1+a}M'_{1-a}O_2$, wherein $-0.03 \le a \le 0.10$, and $M'=Ni_xM''_yCo_zE_d$, wherein $0.30 \le x \le 0.92$ $0.00 \le y \le 0.40$, $0.05 \le z \le 0.40$ and $0 \le d \le 0.05$, with M" being either one or both of Mn or Al, and with E being a dopant different from M", said first compound particles having a span inferior to 1.0 and having a D50 superior equal to 10 µm and inferior or equal to 20 µm,
converting said at least one second fraction lithium deficient intermediate compound into a second compound comprising single crystal monolithic particles having a general formula $Li_{1+b}N'_{1-b}O_2$, wherein $-0.03 \le b \le 0.10$, and $N'=Ni_{x'}N''_{y'}Co_{z'}E'_{d'}$, wherein $0.30 \le x' \le 0.92$ $0.00 \le y' \le 0.40$, $0.05 \le z' \le 0.40$ and $0 \le d' \le 0.05$, with N" being either one or both of Mn or Al, and with E' being a dopant different from N", said monolithic particles having a D50 superior or equal to 2 µm and inferior or equal to 8 µm, and
mixing said first and second compounds so as to form the powderous positive electrode active material, wherein the content of the second compound is superior or equal to 15 wt % and inferior or equal to 65 wt % with respect to the total weight the powderous positive electrode active material, and wherein the content of the first compound is superior or equal to 35 wt % and inferior or equal to 85 wt % with respect to the total weight the powderous positive electrode active material.

Preferably, the sum of the first and second fraction reaches 100 wt % with respect to the total weight of said powderous positive electrode active material.

Embodiment 7

The method according to Embodiment 6, wherein said lithium deficient intermediate compound powder is fractioned so as to obtain one second fraction of precursor particles having a D50 superior to the D50 of the first fraction of precursor particles.

Embodiment 8

The method according to Embodiment 7, wherein said second fraction of lithium deficient intermediate compound powder is fractioned so as to obtain a least two sub-fractions of lithium deficient intermediate compound particles, each of the at least two sub-fractions of lithium deficient intermediate compound having a D50 superior to the D50 of the first fraction of lithium deficient intermediate compound particles.

Embodiment 9

The method according to any of Embodiments 6 to 8, wherein the step of converting said at least one second fraction of lithium deficient intermediate compound particles into said second compound comprises the steps of:
providing a mixture comprising said second fraction of lithium deficient intermediate compound particles and a Li bearing precursor,
subjecting the mixture to a multiple step sintering process whereby in the final sintering step a sintered lithiated intermediate material is obtained comprising agglomerated primary particles having a primary particle size distribution with a D50 between 2.0 and 8.0 µm,
subjecting the lithiated intermediate material to a wet-milling step whereby the agglomerated primary particles are deagglomerated and a slurry comprising deagglomerated primary particles is obtained, and
separating the deagglomerated primary particles from the slurry, preferably followed by a step of drying the deagglomerated primary particles.

Preferably, in the mixture comprising a Ni— and Co— bearing precursor and a Li bearing precursor the Li to transition metal ratio is between 0.65 and 0.95, and the multiple step sintering process comprises the following additional steps:
- a first sintering step in an oxidizing atmosphere at a temperature between 650 and 850° C., for a time between ⅓ and 15 hours, thereby obtaining a lithium deficient precursor powder,
- mixing the lithium deficient precursor powder with either one of LiOH, Li2O and LiOH.H2O, thereby obtaining a second mixture whereby the mixture has a Li to transition metal ratio is between 0.95 and 1.10, and
- sintering the second mixture in an oxidizing atmosphere at a temperature between 800 and 1000° C., for a time between 6 and 36 hours.

Embodiment 10

The method according to Embodiment 9, wherein the wet ball milling step is performed in a solution with the solvent in the solution being water.

Embodiment 11

The method according to any one of the preceding Embodiments, wherein said Ni— and Co— bearing precursor further comprises Mn.

Embodiment 12

The method according to any one of the preceding Embodiments, wherein the step of converting said first fraction of precursor particles or said first fraction of lithium deficient intermediate compound particles into said first compound comprises the steps of:
- providing a Ni— and Co— bearing precursor of said powderous positive electrode active materials, followed by mixing said Ni— and Co— bearing precursor with a first Li bearing precursor so as to obtain a first mixture having a Li/M' molar ratio superior or equal to 0.70 and inferior or equal to 0.95, wherein M' comprises at least Co and Ni, and sintering said first mixture at a temperature superior or equal to 700° C. and inferior or equal to 950° C., so as to obtain the lithium deficient intermediate compound powder,
- or
- providing said lithium deficient intermediate compound powder,
- mixing said lithium deficient intermediate compound powder with a second Li bearing precursor so as to obtain a second mixture having a Li/M' molar ratio substantially equal to 1.00 (+/−0.01),
- sintering the second mixture at a temperature superior or equal to 700° C. and inferior or equal to 950° C. so as to obtain said first compound, followed by optional grinding and sieving steps of said first compound.

Embodiment 13

The method according to any one of the preceding Embodiments wherein M' comprises Ni, Mn and Co.

Embodiment 14

A powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_cMe'_dCo_eK_f$, wherein $0.30 \leq c \leq 0.92$ $0.00 \leq d \leq 0.40$, $0.05 \leq e \leq 0.40$ and $0 \leq f \leq 0.05$, with Me' being either one or both of Mn or Al, and with K being a dopant different from Me', said powderous material being a bimodal mixture of a first fraction of a first compound comprising polycrystalline particles having a general formula $Li_{1+a}M'_{1-a}O_2$, wherein $-0.03 \leq a \leq 0.10$, and $M'=Ni_xM''_yCo_zE_d$, wherein $0.30 \leq x \leq 0.92$ $0.00 \leq y \leq 0.40$, $0.05 \leq z \leq 0.40$ and $0 \leq d \leq 0.05$, with M" being either one or both of Mn or Al, and with E being a dopant different from M", said first compound particles having a span inferior to 1.0 and having a D50 superior equal to 10 μm and inferior or equal to 20 μm, and a second fraction of a second compound comprising single crystal monolithic particles having a general formula $Li_{1+a}M'_{1-a}O_2$, wherein $-0.03 \leq a \leq 0.10$, and $M'=Ni_xM''_yCo_zE_d$, wherein $0.30 \leq x \leq 0.92$ $0.00 \leq y \leq 0.40$, $0.05 \leq z \leq 0.40$ and $0 \leq d \leq 0.05$, with M" being either one or both of Mn or Al, and with E being a dopant different from M", said monolithic particles having a D50 superior or equal to 2 μm and inferior or equal to 8 μm, wherein the content of the second fraction is superior or equal to 15 wt % and inferior or equal to 65 wt % with respect to the total weight the powderous positive electrode active material, and wherein the content of the first fraction is superior or equal to 35 wt % and inferior or equal to 85 wt % with respect to the total weight the powderous positive electrode active material.

In this Embodiment 14, the sum of the first and second fraction reaches 100 wt % with respect to the total weight of said powderous positive electrode active material.

Preferably, said Embodiment 12 refers to a powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_cMe'_dCo_eK_f$, wherein $0.30 \leq c \leq 0.92$ $0.00 \leq d \leq 0.40$ $0.05 \leq e \leq 0.40$ and $0 \leq f \leq 0.05$, with Me' being either one or both of Mn or Al, and with K being a dopant different from Me'

BRIEF DESCRIPTION OF THE FIGURES

FIG. 1-2. PSD curves before and after the $2^{nd}$ fractionation in Example 1-1, x axis: particle size (μm), y axis: volume (%)

FIG. 1-3. FE-SEM image (magnification×1000) of EX1-1-A

FIG. 1-4. FE-SEM image (magnification×5000) of EX1-1-B

FIG. 1-5. Relative capacity as a function of full cell cycle number in CEX1-1C and EX1-1-CC at 4.35V with a cycling temperature of 45° C.

FIG. 1-6. Relative capacity as a function of full cell cycle number in CEX1-2 and EX1-2-C2 at 4.20V with a cycling temperature of 45° C.

FIG. 2-1. PSD curves before and after the fractionation in Example 2-1, x axis: particle size (μm), y axis: volume (%)

FIG. 2-2. FE-SEM image (magnification×1000) of EX2-1-A

FIG. 2-3. FE-SEM image (magnification×5000) of EX2-1-B

DETAILED DESCRIPTION

Figure 1:
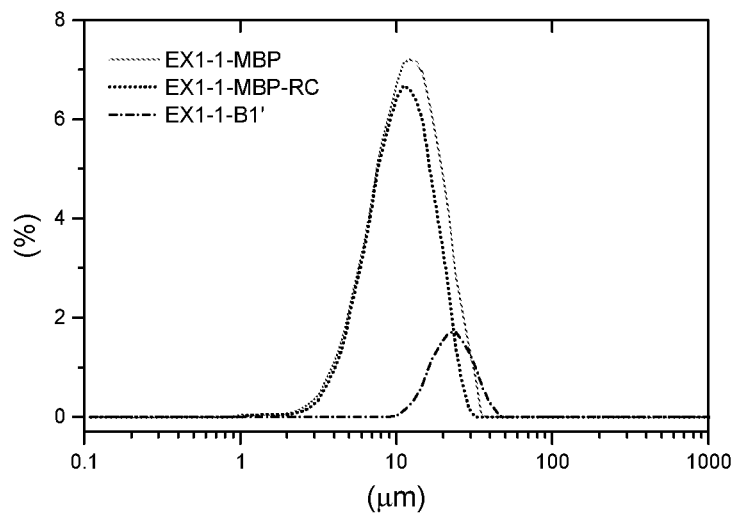
FIG. 1-1. PSD curves before and after the $1^{st}$ fractionation in Example 1-1, x axis: particle size (μm), y axis: volume (%)

In the figures and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

In the present invention, the fractionation process can be a wet (for example using a hydro-cyclone, draft tube etc.) or a dry (for example, by cyclone type air classification, elbow jet classification etc.) process.

The conditions of the fractionation step can be diverse. Table 1-1 shows non-limitative examples of possible fractionation routes related to said fractionation step.

TABLE 1-1

Examples of possible fractionation routes

| | Precursor (Examples) | | Fractionized precursor (Example) | | | |
|---|---|---|---|---|---|---|
| Route # | Category | PSD | ID | Category | Fraction | PSD |
| Route 1 | MBP* | D50: 9 μm span: 1.2 | A1-R1 | Narrow span fraction | 75% | D50: 11 μm span: 0.85 |
| | | | B1-R1 | Fine fraction | 25% | D50: 3 μm span: 1.12 |
| Route 2 | MBP | D50: 24 μm span: 1.3 | A1-R2 | Narrow span fraction | 70% | D50: 17 μm span: 0.90 |
| | | | B1-R2 | Coarse fraction | 30% | D50: 28 μm span: 1.11 |
| Route 3 | MBP | D50: 12 μm span: 1.4 | A1-R3 | Narrow span fraction | 55% | D50: 13 μm span: 0.72 |
| | | | B1-R3 | Fine fraction | 30% | D50: 6 μm span: 0.85 |
| | | | B1'-R3 | Coarse fraction | 15% | D50: 22 μm span: 0.91 |

*MBP: metal bearing precursor

The present invention covers a first method for preparing a N(M)C positive electrode material having the above-mentioned advantages. The method comprises precipitation, fractionation, lithiation, and mixing. The positive electrode material (referred as Compound C hereafter) comprises a first lithium transition metal oxide based powder (referred as Compound A hereafter) having a PSD with a span less than 1.0 and an average particle size D50 between 10 and 20 μm and a second lithium transition metal oxide (referred as Compound B) having a monolithic morphology and an average particle size D50 between 2 and 8 μm, wherein the weight ratio of the first powder in the mixture is between 35 and 85%, the weight ratio of the second powder in the mixture is between 15 and 65%.

The span of the particle size distribution is defined as (D90−D10)/D50.

The values of D10, D50, and D90 are defined as the particle size at 10%, 50%, and 90% of the cumulative volumetric particle size distribution.

In the present description, following terms are used to define the SPAN ranges referred to: 1.1≤normal SPAN, 0.8<narrow SPAN <1.1, and very narrow SPAN ≤0.8.

Moreover, in the present description, a fine fraction (or particles) is defined as a fraction having D50 of less than 8 μm, preferably less than 4 μm. A coarse fraction (or particles) is defined as a fraction having D50 of higher than 18 μm.

The combination of the precursor fractionation step with the lithiation step according to the present invention brings an effect consisting in that the desired N(M)C cathode material is obtained by a process wherein the span of the precursor is not an essential parameter, and wherein the control of the PSD of solely one fraction is requested, thereby making the implementation of such a process much easier than the processes known from the prior art.

Starting from this Table 1-1, the method for preparing a N(M)C-based positive electrode materials according to the present invention comprises the following steps:
  Precipitation of a metal (at least Ni— and Co—, preferably comprising Mn—) bearing precursor (MBP),
  Fractionation of the MBP in a first (A1) fraction and at least one second (for instance B1 and optionally B1') fraction,
  Lithiation of each of the first and second fraction, wherein the A1 fraction is converted into a first polycrystalline lithium transition metal oxide-based powder and the B1 type of fraction(s) is(are) converted into a second lithium transition metal oxide-based powder and, and
  Mixing the first and second monolithic lithium transition metal oxide-based powder to obtain the N(M)C-based positive electrode material.

The N(M)C-based positive electrode material (referred as Compound C hereafter) results from the mixing of the first lithium transition metal oxide based powder (referred as Compound A hereafter) having a PSD with a span less than 1.0 and an average particle size D50 between 10 and 20 μm with a second lithium transition metal oxide (referred as Compound B) having a monolithic morphology and an average particle size D50 between 2 and 8 μm, wherein the weight ratio of the first powder in the mixture is between 35 and 85%, the weight ratio of the second powder in the mixture is between 15 and 65%.

For the purpose of illustrating the process according to the present invention, each of the above-provided step related to the implementation of the claimed process are described hereunder in a non-limitative way.

A) Precipitation

The MBP can be a mixed metal hydroxide (M'(OH)$_2$), metal oxyhydroxide (M'O$_{m'}$(OH)$_{2-m'}$), metal oxide (M'O$_{m'}$), metal carbonate (M'CO$_3$), or mixtures of these.

The precipitation-base process is the most popular process to prepare metal bearing precursors such as a mixed metal hydroxide. For example, flows of dissolved metal salts like M'SO$_4$ (M'=Ni, Co, or Mn) and dissolved base like NaOH are fed to a reactor under agitation. Additionally, additive flows like ammonia can be added to the reactor. A mixed metal hydroxide product precipitates and it is filtered and dried.

There are several complicated precipitation techniques to prepare A1 having a narrow span PSD including (a) batch precipitation, repeated batch precipitation or precipitation during continuous removal of mother slurry, (b) a reactor cascade, i.e. several reactors connected in series where the product of one reactor is fed to the next reactor, and (c) continuous precipitation involving classification and back-feeding of particles.

In particular, a simple continuous precipitation is preferred due to its big advantages compared with the other options. A normal continuous precipitation process using a continuous stirred tank reactor (also called CSTR for continuous stirred-tank reactor) is much simpler than the other known processes and has a higher throughput. The CSTR precipitation is a truly continuous process. Once a steady state condition is achieved, the precipitation can continue for a very long time. Monitoring the steady state conditions (temperature, pH, and particle size) and adjusting the temperature and flow rates allow to keep the steady state conditions stable. The reactor can operate for days, weeks, even months, which makes the CSTR process inherently the cheapest process. The disadvantage of the CSTR is that particles have a size distribution depending on residence time in the reactor. Feeding solutions continuously into the reactor means that fresh and old solution are mixed. The slurry is removed by the overflow.

In a CSTR-based process, a reference particles size distribution is related to a reference residence time of said particles in the reactor.

Particles in the slurry which reside a shorter time than the reference time in the reactor are of small size. Particles which reside a longer time than the reference time are larger. As the result, the precipitated particles have a particle size distribution. Typically, the span of a MBP from obtained by a CSTR-based process is between 1.1 and 1.5.

B) Fractionation

The metal bearing precursor fractions A1 and B1 can be obtained by the fractionation process from a metal bearing precursor prepared by the CSTR.

Classifying only a certain amount of fine particles from a metal bearing precursor might be enough to obtain A1 having a span and a D50 according to claim 1, as described in Route 1 of Table 1-1.

Classifying only a certain amount of coarse particles also might be enough to obtain proper A1 PSD (SPAN and D50) properties according to claim 1, as described in Route 2 of Table 1-1.

The purpose of Route 1 and 2 is to obtain an easier implementation of the process since single fractionation step is required.

The preferred fractionation process is classifying both fine and coarse particles from a metal bearing precursor as described in Route 3 of Table 1-1.

This fractionation procedure results in three fractionized metal bearing precursors having different D50 including A1 having a very narrow span. Both fine and coarse particles can be used as B1.

The fractionation process can be a wet (for example using a hydro-cyclone, draft tube etc.) or a dry (for example, by cyclone type air classification, elbow jet classification etc.) process.

The amount of A1 obtained by fractionation processes should be at least 40 wt % and at most 85 wt % of the total used metal bearing precursor.

In this route 3, both the fine and coarse particles can be converted into the second lithium transition metal oxide-based powder.

However, the preparation of Compound B from a metal bearing precursor which has a coarse particle size (for instance B1') can be eased if said Compound B is made from a fraction of a metal bearing precursor having a Ni content that is optimized so as to allow a homogeneous sintering of primary particles from said precursor.

For example, this optimized Ni content may correspond to a molar ratio of Ni in M' (Ni/M') lower or equal to 80%.

For a molar ratio Ni/M' superior to 80%, it is preferred to recycle said second fraction by dissolving it into a sulfuric acid solution, the resulting obtained M'SO$_4$ can be used again as a feed solution of the precipitation process.

C) Lithiation

The Compound A is prepared by a sintering step from A1 compound resulting from the above-mentioned fractionation process. Optionally, the conversion of A1 into Compound A is achieved through a double sintering process, as disclosed for instance in the patent application WO2017-042654A1 (from page 8 line 27 to page 9 line 7).

The Li sources can be a lithium hydroxide (LiOH), lithium hydroxide anhydrous (LiOH.H$_2$O), lithium carbonate (Li$_2$CO$_3$), or mixtures of these.

In particular, the use of oxygen gas and LiOH instead of air and Li$_2$CO$_3$ are preferred to achieve the high quality of Compound A if the molar ratio Ni/M' of the A1 type of MBP is higher than 60%. The sintering temperature and time are parameters which decide the primary particle size of Compound A. Compound A should have a polycrystalline morphology since the monolithic compounds as a large particle of a bimodal product generally has a low capacity. After sintering, the sintered agglomerated compound needs to be crushed by an industrial milling equipment and screened.

The compound A has a general formula of Li$_{1+a}$M'$_{1-a}$O$_2$, wherein $-0.03 \leq a \leq 0.10$, and M'=Ni$_x$M''$_y$Co$_z$E$_d$, wherein $0.30 \leq x \leq 0.92$ $0.00 \leq y \leq 0.40$, $0.05 \leq z \leq 0.40$ and $0 \leq d \leq 0.05$, with M'' being either one or both of Mn or Al, and with E being a dopant different from M''.

The Compound B, which has a monolithic morphology, is also prepared by a sintering of B1 compound and proper milling process. Optionally, the sintering of B1 compound is achieved through a double sintering process, as disclosed for instance in the patent application WO2017-042654A1 (from page 8 line 27 to page 9 line 7).

The compound B has a general formula of Li$_{1+b}$N'$_{1-b}$O$_2$, wherein $-0.03 \leq b \leq 0.10$, and N'=Ni$_{x'}$N''$_{y'}$Co$_{z'}$E'$_{d'}$, wherein $0.30 \leq x' \leq 0.92$ $0.00 \leq y' \leq 0.40$, $0.05 \leq z' \leq 0.40$ and $0 \leq d' \leq 0.05$, with N'' being either one or both of Mn or Al, and with E' being a dopant different from N''.

The D50 of Compound B should be at least 2 μm and at most 8 μm. The preferable span of Compound B is less than 1.5 to obtain a homogenous size distribution of Compound B particles. The steps to prepare this monolithic Compound B comprise growing primary particles as big as the target D50 during lithiation (i.e. in the range defined from 2 to 8 μm) and producing primary particles from deagglomeration of the particles obtained from the sintering step by a dry milling process (for example, air jet milling) or a wet milling process (for example, wet ball milling).

There are several ways to handle B1 compounds which have different particle sizes from a fractionation process. In case of Route 1 and 2 of Table 1-1, it is straightforward to follow the abovementioned steps using the fine particles (B1-R1) or coarse particles (B1-R2).

In case of Route 3, there are several possibilities to prepare Compound B. A first option consists in preparing Compound B by firstly converting a fine fraction and a coarse fraction of the metal bearing precursor (B1-R3 and B1'-R3) in two separate monolithic fractions which are mixed to achieve the Compound B.

A second option consists in firstly mixing the fine and coarse metal bearing precursor fractions (B1-R3 and B1'-R3) so as to obtain a mixture of two precursor fractions and converting said mixture into the monolithic Compound B.

A third option would be a lithiation of each of the coarse and fine metal bearing precursor fractions separately followed by a milling of said fractions together so as to achieve the monolithic Compound B grade.

The PSD of secondary particles in fine fraction and coarse fraction after a sintering step for Compound B is not important if primary particles have the size of at least 2 μm and at most 8 μm. Independently of the PSD of secondary particles, primary particles in a secondary particle can be deagglomerated by proper milling processes. The proper milling processes include an air jet milling and wet ball milling. Fine tunings of air jet milling condition such as air flow or wet ball milling condition such as ball size, time, and tip speed will allow to deagglomerated primary particles from a secondary particle without breaking primary particles.

D) Mixing

The prepared Compound A and Compound B are mixed to prepare Compound C.

A surface modification such as Al, Co, or F (multiple) coating(s) can be optionally applied on each Compound A and Compound B separately before mixing.

The surface modification comprises dry or wet blending with coating agents followed by a heat treatment. The blending step for the surface modification can be done together when Compound A and Compound B are mixed.

The present invention further covers an alternative (second) method to the above-provided first method of manufacturing a N(M)C positive electrode material.

This second method has all the steps of the first method, but the lithiation step is a double sintering-based process and a first sintering step is performed prior to the fractionation step.

This first sintering steps consists in converting the MBP obtained from the precipitation step A) into a lithium deficient intermediate (LDI) compound.

In this first sintering step, the precipitated metal bearing precursor is reacted with a first lithium source, this reaction leading to the formation of the lithium deficient intermediate compound. The first sintering steps is preferably performed so as to achieve a LDI compound having a Li/M' molar ratio, with M'=Co, Ni and optionally Mn, between 0.70 and 0.95. The first sintering temperature is preferably between 700° C. and 950° C.

The LDI compound from the first sintering step has a polycrystalline morphology. The PSD of the LDI compound is substantially the same as the one of the metal bearing precursor, meaning that the LDI compound has a span between 1.1 and 1.5.

Like in the first method, but instead of the MBP, this is the LDI compound that is fractionated.

Table 2-1 shows examples of possible fractionation routes related to the second method according to the invention.

TABLE 2-1

Examples of possible fractionation routes

| Route # | Li deficient intermediate (Examples) | | Fractionized Li deficient intermediate | | | |
|---|---|---|---|---|---|---|
| | Category | PSD | ID | Category | Fraction | PSD |
| Route 1 | LDI** | D50: 9 μm span: 1.2 | LDI-A1-R1 | Narrow span fraction | 75% | D50: 11 μm span: 0.85 |
| | | | LDI-B1-R1 | Fine fraction | 25% | D50: 3 μm span: 1.15 |
| Route 2 | LDI | D50: 24 μm span: 1.3 | LDI-A1-R2 | Narrow span fraction | 70% | D50: 17 μm span: 0.92 |
| | | | LDI-B1-R2 | Coarse fraction | 30% | D50: 28 μm span: 1.11 |
| Route 3 | LDI | D50: 12 μm span: 1.4 | LDI-A1-R3 | Narrow span fraction | 55% | D50: 13 μm span: 0.73 |
| | | | LDI-B1-R3 | Fine fraction | 30% | D50: 6 μm span: 0.86 |
| | | | LDI-3 B1'-R | Coarse fraction | 15% | D50: 22 μm span: 0.91 |

**LDI: lithium deficient intermediate compound

After the fractionation is completed (for instance according to the Routes provided in Table 2-1), a second sintering step of the lithiation step is performed so as to achieve Compounds A and B according to the present inventions.

Referring to Table 2-1, for each of the LDI fractions A and B, this second sintering step comprises: i) mixing the lithium deficient intermediate compound with a second lithium source, ii) sintering said lithium deficient intermediate compound and second lithium source at a temperature between 700° C. and 950° C. so as to obtain Compounds A and B, respectively. The second sintering treatment is effected independently for each of the LDI fractions A and B.

Compound C can therefore be obtained as according to the above-described step D), but from the Compounds A and B obtainable by the second method.

In summary, the second method of manufacturing a N(M)C cathode material according to the invention has all the steps A) to D) of the first method, with the exception of that in the step C) (lithiation), a double sintering-based step is chosen wherein a first sintering step is performed before the fractionation step B) and a second sintering is performed after said fractionation step and before the mixing step D) is performed.

There are benefits related to the first method according to the present invention. The coarse fraction after fractionation (B1'-R3) in the first method can be easily recycled by dissolving in sulfuric acid while that (LDI-B1'-R3) in the second method cannot be easily recycled due to Li. Additionally, the fractionation process can be done in dry air in the first method because carbon contamination of MBP is less severe than that of LDI.

The purpose of the second method according to the present invention is to obtain an easier implementation of the process due to the combined first sintering step.

The present invention is also inclusive of a N(M)C cathode material.

A particular but not limitative embodiment of the N(M)C cathode material according to the invention is the Compound C.

Compound C of the present invention has clear advantages. Particles of conventional N(M)C positive electrode materials are usually spherical and always polycrystalline. For increasing the volumetric density, the present invention provides of a lithium transition metal oxide ("bimodal PSD") compound (Compound C) that can be used as positive electrode materials for lithium ion batteries, comprising a large regular spherical polycrystalline compound (Compound A) and a small monolithic filler compound (Compound B), within a certain weight ratio between compounds A and B.

Since the particles of Compound A are spherical, there is void formed between said particles, said void corresponding to a certain degree of porosity. Theoretically, in a closed packing system of equal spherical particles, the maximum volume fraction of space occupied by said spherical particles is around 74 vol %. The remaining 26 vol % is void (pores) that can be filled by smaller particles.

Therefore, by using the right amount of smaller particles (Compound B) the volumetric density can be increased.

The volume of pores may depend on the morphology of the matrix formed by the Compound A. Compound B which is, like Compound A, a positive active material, is designed so as to fill the void (pores) in order to maximize the volumetric (energy) density. As the fine particle fraction may have a very high specific surface area, it can contribute excessively to potential undesired side reactions with the electrolyte, causing a poor battery cycle life. The fine particles of the invention are more resistant against these side reactions as they have a smaller surface area.

The positive electrode materials having a bimodal particle size distribution according to the invention allows to obtain a high pressed density, leading to a high energy density.

The PSD of Compound C influences its flowability and compaction properties, and both the powder flowability and powder compactability matter in the electrode preparation to achieve a high electrode density. Higher compactability means that particles can be closely packed with less pores, compared to a cathode material having lower compactability, when the particles are pressed. Larger particles typically flow more easily than smaller ones, and more spherical ones flows more easily than those having high aspect ratio particles. The typical industrial process to prepare lithium transition metal composite oxides, including co-precipitation, screening, filtering, milling, and screening steps determine the sphericity (aspect ratio close to one of shape of the particles). However, particle size variability is high. The natural PSD of this type of materials typically has a span of 1.1-1.5. In practice, LIBs used for EVs require a certain D50 range of positive electrode materials to gain the best electrochemical performances, typically between 5 µm to 25 µm. Generally, a positive electrode material having higher D50 presents the benefit of having a higher electrode density. However, in the normal span product, the increase of D50 is more limited by the particle size of big particles such as particles having particle sizes of bigger than the D99 value for this normal span. If this D99 exceeds the thickness of the positive electrode which is normally thinner than 50 µm, there are the risks of particle breaking, electrode biting, electrode detaching after calendering etc., as the calendering pressure is transferred by the largest particles onto smaller particles, creating locally a large force on the ductile aluminum foil leading to electrode biting. In other words, for a normal span-based powder, the risk to see particle breaking occurring for said powder having an increased D50 value is high.

Applying a positive electrode material with narrow span, which is in this invention applicable for Compound A, allows to use powders with a larger D50 and a corresponding smaller D100, D99 or D99/D50, especially when the pressure during electrode calendering is increased to reach a higher electrode density.

Although Compound A with a narrow span is preferred for the above-provided reasons, using only Compound A with narrow span is not beneficial to achieve high electrode density. The powder compact density made from such a compound-base powder is simply limited by the voids between particles with similar size. Particle breaking under excessive calendering can improve the electrode density to some extent. However, particle breaking is not preferred for reasons described before, such as cycle stability and side reactions during cycling. Therefore, the use of Compound A together with a smaller filler material is still preferred to achieve high electrode density.

Compound A is a polycrystalline material. A "polycrystalline" morphology refers to a morphology where a secondary particle contains more than one primary particles.

As previously said, the disadvantage of a bimodal PSD active cathode material power is its high surface area of the small particles that can cause difficulties when making a slurry during the electrode coating process. Also, during cycling of said bimodal PSD cathode powder, an increase of side reactions with the electrolyte can be observed. To minimize the increase of the surface area in the final positive electrode made from the bimodal PSD active material, the small particles need to have a smooth surface and a low open porosity. Since the surface area of the product can further increase during the calendering process, the small particles should also be as hard as possible. Additionally, in-order to achieve a high density, the small particles should also be free of internal porosity.

This leads to the use of "Monolithic" materials for Compound B that fulfil the above requirements. A "monolithic" morphology refers here to a morphology where a secondary particle contains basically only one primary particle. In the literature they are also called single crystal material, monocrystal material, and one-body material. The preferred shape of the primary particle could be described as pebble stone shaped, having an aspect ratio near to 1. The monolithic morphology can be achieved by using a high sintering temperature, a longer sintering time, and the use of a higher excess of lithium. Since monolithic materials have a smooth surface and less internal pores, the surface area is low, and the particle strength is high.

In the present invention, the small monolithic particles (Compound B) may have a particle size distribution with 2 µm≤D50≤8 µm. When the average particle size is more than 8 µm, the battery performance is worsening, and the filler effect is likely to be lost. If, on the contrary, the particle size is too small (i.e. <2 µm), it is difficult to prepare the powder using state of the art processes. For example, the powder cannot be sieved easily because of particle agglomeration. In addition, it is difficult to obtain product homogenously mixed with the large positive electrode materials due to agglomeration. In terms of the production process, a monolithic positive electrode material that has a D50 of around 3 µm can be produced by currently known industrial processes, as is disclosed for example in US2017/00288233. In this process, the PSD and the morphology of Compound B are mostly determined by the firing and milling conditions, and less by the PSD of the mixed transition metal precursor (B1). In particular, there is less needing to supply a B1 powder which specially shaped particles. Therefore, any fractionized metal bearing precursors can be used as B1.

Surprisingly, when monolithic Compound B is used as a filler, the particle breaking of Compound A having a narrow span can be better suppressed by the buffering effect of the monolithic filler. Compound A is generally brittle since it is polycrystalline. Generally, the higher the Ni content Compound A has, the more brittle it is. However, the occurrence of particle breaking of Compound A mixed with Compound B is very limited, even when Compound A has a high Ni content such as 87 mol % (vs. the total transition metal content). The Compound C in this invention generally has ID10 (D10 increase) of at least −10% and IB (BET increase) of at most 10%, which are measured by following proposed analysis methods, as criteria of high particle strength. Less damage is expected for the electrode even after harsh calendering, due to the effect of the components. Especially when 20% to 60% of monolithic Compound B is used with narrow span Compound A, the electrode density is the highest. Therefore, the product proposed in the invention is suitable for the application of high energy density electrodes. This approach differs from the state of art where the small particles are brittle and "sacrificed", during pressing the small particles break and fill the space between the large particles and thus, by a cushion effect the large particles are prevented from breaking. Surprisingly, the monolithic small particles—despite of being hard—also prevent the breaking of the large particles This property may be related to an easy re-positioning and gliding due to the smooth surface and the special pebble stone type shape.

To conclude, the present invention combines the following aspects:

1) As LIBs require a high energy density, it is possible to increase the volumetric energy density by using two or more positive electrode materials which have different particle size distributions. The method for preparing positive electrode materials from a metal bearing precursor is the one of the scopes covered by the present invention.

2) The obtained metal bearing precursor having a narrow span PSD or span can be used as a precursor of one of positive electrode materials which can be mixed with the other positive electrode materials. The remaining fractionized metal bearing precursors such as small particles or big particles can be used as precursors of other positive electrode materials. Finally, the mixture of two or more positive electrode materials has high volumetric energy density.

3) Among the components of the positive electrode, the material having the biggest particle size determines the maximum particle size of the entire positive electrode material. As there is a tendency to increase the average particle size of positive electrode material, generally the volumetric density of the entire positive electrode increases. However, the maximum particle size should be as small as possible for electrode processing purposes.

4) Among the components of the positive electrode, the material having the smallest particle size determines the surface area of the entire positive electrode material. The surface area of positive electrode materials should be limited to avoid undesirable side reactions.

5) The particles of positive electrode materials can crack during electrode processing, i.e. the calendering process, but also during cycling. The cracking of particles creates additional surface, resulting in the increase of surface area which is not desirable. Therefore, the positive electrode materials should be as hard as possible.

Electrode powders are usually characterized by a pressed powder density method which is widely applied in the industry. In the method, powders are filled into a mold and pressed with a defined force, for example 200 MPa, and the thickness of the obtained pellet is measured and using the known mass allows to calculate the powder density. Generally, there is a good correlation between the pressed powder density and the density of electrodes which have been calendared applying a corresponding force as used in the method above. This pressed density method can then be used to predict the electrode density.

To judge the degree of particle breaking and the increase of surface area after a calendering process, PSD analysis is performed before and after applying a certain pressure. The pressed density measurement in the invention applies a pressure of 200 MPa, which is sufficiently high pressure to break some of the particles if the positive electrode material has a normal brittleness. It is also low enough to avoid excessive compaction. For example, a powder which does not compact well under that pressure will not allow to achieve a high density. Thus, applying a pressure of 200 MPa allows to distinguish between positive electrode material powders which easily achieve a high density, and those which would need a higher pressure to be compacted. The latter powders will be the ones that cause electrode damage due to "biting". Therefore, the obtained density is a measure of the electrode density that can be achieved without excessively damaging the electrode.

Additionally, the pressure of 200 MPa allows to quantify the damage to a powder during the pressing. If the powder is very brittle and does not compact easily, particles will break. Similar breaking will happen in an electrode during calendering. Avoiding powder damage is important to achieve a good cycle life because—besides avoiding damage to the alumina foil—broken particles increase the surface area, resulting in fast side reactions. Additionally, broken particles can have poor electrical contact. Finally, if broken particles are small, they can diffuse within the electrolyte and damage the anode. The breaking during electrode processing can be estimated from the powder pressing results. If particles break, finer particles are created. Therefore, the PSD changes and additional fresh surface area is created. The damage during powder pressing can be quantified by the analysis of the PSD curve before and after pressing. The more the PSD curve moves left (caused by creating of smaller particles), the more powder damage has happened. An easy approach to quantify particle breaking by PSD is the ID10 number. This number is defined as ID10=(D10 after PDM−D10 before PDM)/D10 before PDM (expressed in %) where PDM is the pressed density measurement described below. ID10 is negative if particles break and finer particles are created. The larger the absolute value of this number is, the finer particles have been created. Otherwise, if the powder compacts easily without breaking, the cushioning effects prevent breaking and the high density is obtained without major particle damage. In this case the absolute value of ID10 is near to zero.

The following analysis methods are used in the Examples:

A) Pressed Density Measurement

The pressed density (PD) is measured as follows: 3 g of powder is filled in a pellet die with a diameter "d" of 1.3 cm. A uniaxial pressure of 200 MPa, is applied to the pellet for 30 seconds. After relaxing the load, the thickness "t" of the pressed pellet is measured. The pressed density is then calculated as follows:

$$PD = \frac{3}{\pi\left(\frac{d}{2}\right)^2 t} \text{(in g/cm}^3\text{)}$$

After pressing, the powder is further investigated by a PSD measurement.

B) PSD Measurement

The particle-size distribution (PSD) of the powder before and after A) PD measurement is analyzed using a Malvern Mastersizer 3000 with Hydro MV wet dispersion accessory after dispersing the powder in an aqueous medium. In order to improve the dispersion of the powder in the aqueous medium, sufficient ultrasonic irradiation and stirring are applied and an appropriate surfactant is introduced. D10, D50, and D90 are defined as the particle size at 10%, 50%, and 90% of the cumulative volume % distribution. A change of the D10 before and after pressing under 200 MPa is calculated as follows:

$$D10 \text{ increase } (ID10) = \frac{D10 \text{ after } PDM - D10 \text{ before } PDM}{D10 \text{ before } PDM} \times 100 \text{ (in \%)}$$

The effect on the pressed density by the D10 increase (or decrease) can be used as a good criterion to quantify the damage to a powder under a pressure of 200 MPa.

C) FE-SEM Analysis

A morphology of a material is analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. The images of samples are recorded with several magnifications (×1,000 to 10,000) to demonstrate the monolithic structure of materials. To define the monolithic property, the number of primary particles in a secondary particle is measured in a SEM image with a magnification of 5000 times for ten randomly selected secondary particles. Since a SEM image only shows a morphology of powders from a top view, the counting of primary particles is performed within the field of view of the SEM image.

D) Coin Cell Analysis

For the preparation of a positive electrode, a slurry that contains a positive electrode material, conductor (Super P, Timcal), binder (KF #9305, Kureha)—with a formulation of 90:5:5 by weight—in a solvent (NMP, Mitsubishi) is prepared by a high-speed homogenizer. The homogenized slurry is spread on one side of an aluminum foil using a doctor blade coater with a 230 μm gap. The slurry-coated foil is dried in an oven at 120° C. and then pressed using a calendering tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as negative electrode. 1M $LiPF_6$ in EC/DMC (1:2) is used as electrolyte and is dropped between separator and electrodes. Then, the coin cell is completely sealed to prevent leakage of the electrolyte.

The coin cell analysis is performed by a conventional "constant cut-off voltage" test. Each cell is cycled at 25° C. using a Toscat-3100 computer-controlled galvanostatic cycling station (from Toyo). The coin cell testing procedure uses a 1 C current definition of 160 mA/g. The coin cell is charged with 0.1 C until the voltage reaches 4.3V. After 30 minutes, it is discharged with 0.1 C until the voltage reaches 3.0V so that the first discharge capacity is obtained. The discharge capacity is normalized by the density obtained by the pressed density measurement so that the volumetric first discharge capacity DQ1 (mAh/cm$^3$) is obtained.

E) Full Cell Analysis 650 mAh (flexible) pouch-type cells are prepared as follows: the positive electrode material, Super-P (Super-P, Timcal), graphite (KS-6, Timcal) as positive electrode conductive agents and polyvinylidene fluoride (PVDF 1710, Kureha) as a positive electrode binder are added to N-methyl-2-pyrrolidone (NMP) as a dispersion medium so that the mass ratio of the positive electrode active material powder, positive electrode conductive agents (super P and graphite) and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm thick aluminum foil. The width of the applied area is 43 mm and the length is 406 mm. The typical loading weight of a positive electrode active material is about 11.5±0.2 mg/cm$^2$. The electrode is then dried and calendared using a pressure of 120 kgf (1176.8 N) to an electrode density of 3.3±0.05 g/cm$^3$. In addition, an aluminum plate serving as a positive electrode current collector tab is arc-welded to an end portion of the positive electrode.

Commercially available negative electrodes are used. In short, a mixture of graphite, carboxy-methyl-cellulose-sodium (CMC), and styrenebutadiene-rubber (SBR), in a mass ratio of 96/2/2, is applied on both sides of a 10 μm thick copper foil. A nickel plate serving as a negative electrode current collector tab is arc-welded to an end portion of the negative electrode. A typical loading weight of a negative electrode active material is 8±0.2 mg/cm$^2$. Non-aqueous electrolyte is obtained by dissolving lithium hexafluorophosphate (LiPF$_6$) salt at a concentration of 1.0 mol/L in a mixed solvent of ethylene carbonate (EC), ethylmethyl carbonate (EMC), diethyl carbonate (DEC) in a volume ratio of 1:1:1.

A sheet of positive electrode, negative electrode, and a separator made of a 20 μm thick microporous polymer film (Celgard® 2320, Celgard) interposed between them are spirally wound using a winding core rod in order to obtain a spirally-wound electrode assembly. The assembly and the electrolyte are then put in an aluminum laminated pouch in a dry room with dew point of −50° C., so that a flat pouch-type lithium secondary battery is prepared. The design capacity of the secondary battery is 650 mAh when charged to 4.2V or 4.35V.

The non-aqueous electrolyte solution is impregnated for 8 hours at room temperature. The battery is pre-charged to 15% of its expected capacity and aged for a day at room temperature. The battery is then degassed, and the aluminum pouch is sealed. The battery is prepared for use as follows: the battery is charged using a current of 0.2 C (with 1 C=630 mA) in CC mode (constant current) up to 4.2V or 4.35V, then in CV mode (constant voltage) until a cut-off current of C/20 is reached, before the discharge in CC mode at 0.5 C rate, down to a cut-off voltage of 2.7V.

The prepared full cell battery is charged and discharged several times under the following conditions at 45° C. to determine the charge-discharge cycle performance:

Charging is performed in CC mode under 1 C rate up to 4.2V or 4.35V, then CV mode until C/20 is reached, The cell is then set to rest for 10 minutes, The discharge is done in CC mode at 1 C rate down to 2.7V, The cell is then set to rest for 10 minutes, The charge-discharge cycles proceed until the battery reaches 80% retained capacity. Every 100 cycles, one discharge is done at 0.2 C rate in CC mode down to 2.7V.

F) BET Analysis

The specific surface area of the powder before and after the pressed density measurement (PDM) is analyzed with the Brunauer-Emmett-Teller (BET) method using a Micromeritics Tristar 3000. A powder sample is heated at 300° C. under a nitrogen (N$_2$) gas for 1 hour prior to the measurement in order to remove adsorbed species. The dried powder is put into the sample tube. The sample is then de-gassed at 30° C. for 10 min. The instrument performs the nitrogen adsorption test at 77K. As obtaining the nitrogen isothermal absorption/desorption curve, the total specific surface area of the sample in m$^2$/g is yielded. A change of the BET specific surface area before and after pressing under 200 MPa is calculated as follows:

$$BET\ increase\ (IB) = \frac{BET\ after\ PDM - BET\ before\ PDM}{BET\ before\ PDM} \times 100\ (in\ \%)$$

PDM: Pressed density measurement under a pressure of 200 MPa

The invention is further exemplified in the examples provided hereunder.

1. EXAMPLES ACCORDING TO THE FIRST METHOD OF MANUFACTURING A N(M)C CATHODE MATERIAL

Example 1-1

The positive electrode material EX1-1-CC and EX1-1-C, having a general formula of Li((Ni$_{0.625}$Mn$_{0.175}$Co$_{0.200}$)$_{1-d}$E$_d$)O$_2$ with E being Al and F wherein $0 \le d \le 0.05$, are prepared by following procedure. Table 1-2 shows the overview of the process in Example 1-1.

1) A metal bearing precursor is obtained by a precipitation (P1.1) in a pilot line. The process uses a larger-scale (about 100 L) CSTR. A feed of metal sulfate solution (2 mol/L M'SO$_4$, wherein M'=Ni$_{0.625}$Mn$_{0.175}$Co$_{0.200}$) and a feed of sodium hydroxide solution (10 mol/L NaOH) are supplied to the reactor. Additionally, a flow of NH$_4$OH solution (15 mol/L) is added as a complexing agent. The residence time—being the reactor volume divided by total flow rate— is 3 hours, and the temperature is set at 60° C. A protective atmosphere of N$_2$ is recommended to keep the level of impurities low. The collected precipitated metal bearing precursor slurry is filtered and washed by de-ionized water, and then dried at 150° C. for 24 hours under N$_2$ atmosphere, obtaining the mixed metal bearing precursor M'O$_{0.43}$(OH)$_{1.57}$ with metal composition M'=Ni$_{0.625}$Mn$_{0.175}$Co$_{0.200}$. It is named EX1-1-MBP.

2) EX1-1-MBP is classified into three metal bearing precursors which have different particle size by a fractionation technique. The fractionation is done using a "CLASS-IEL N-5" type of air separator. The air flow is 5~8 m$^3$ per a minute and the RPM is 9000. 50 kg of EX1-1-MBP is injected into the equipment. 7.5 kg of coarse fraction (15% of total amount) is classified during the 1$^{st}$ fractionation (P2.1) and named EX1-1-B1'. The remaining 42.5 kg of powder is named EX1-1-MBP-RC. 15 kg of fine fraction (30% of total amount) in EX1-1-MBP-RC is classified during the 2$^{nd}$ fractionation (P2.2) and named EX1-1-B1. The remaining 27.5 kg of power (55% of total amount) is named EX1-1-A1.

3-A) EX1-1-A and EX1-1-AC are obtained through a double sintering process as discussed in the patent application WO2017-042654A1 (from page 8 line 27 to page 9 line 7). The process includes two separate sintering steps. To obtain lithium deficient sintered precursor, LiOH.H$_2$O and EX1-1-A1 are homogenously blended with Li/M' ratio of 0.85. The first blend is sintered at 800° C. for 10 hours an oxygen atmosphere in a chamber furnace (P3.1). After the 1$^{st}$ sintering, the sintered cake is crushed, classified and sieved to powder which is the lithium deficient sintered precursor (F3.1). F3.1 is blended with LiOH.H$_2$O in order to correct the Li stoichiometry to Li/M'=1.00. The blend from the 2$^{nd}$ blending is sintered at 840° C. for 10 hours in a dry air atmosphere in a chamber furnace (P3.2). The 2$^{nd}$ sintered product is grinded and sieved to avoid the formation of agglomerates and named EX1-1-A. The surface modification is performed with Al and F (P3.3). EX1-1-A is blended with 0.2% of nano alumina powder in weight and the blend is heated at 750° C. for 5 hours in a dry air atmosphere. The obtained product is blended with 0.2% of nano alumina powder and 3% of PVDF powder (Kynar Flex) in weight and the blend is heated at 375° C. for 5 hours in a dry air atmosphere and named EX1-1-AC.

3-B) EX1-1-B and EX1-1-BC are obtained through a double sintering process. To obtain lithium deficient sintered precursor, LiOH.H$_2$O, EX1-1-B1', and EX1-1-B1 are homogenously blended with Li/M' ratio of 0.90. The first blend is sintered at 800° C. for 10 hours an oxygen atmosphere in a chamber furnace (P3.4). After the 1$^{st}$ sintering, the sintered cake is crushed, classified and sieved to powder which is the lithium deficient sintered precursor (F3.3). F3.3 is blended with LiOH.H$_2$O in order to correct the Li stoichiometry to Li/M'=1.05. The blend from the 2$^{nd}$ blending is sintered at 960° C. for 10 hours in a dry air atmosphere in a chamber furnace (P3.5). To separate the primary particles from the sintered agglomerated particles, 50 g of obtained sintered agglomerated particles and 50 ml of water are put on a 250 ml bottle which is filled with 10 mm zirconia balls (25% volume of the bottle). The ball milling is proceeded with 50 RPM for 15 hours. The diameter of the bottle and the ball mill roller are both 6 cm. The obtained milled compound is filtered, dried at 150° C. for 5 hours, and named EX1-1-B.

The surface modification is performed with Al and F (P3.6). EX1-1-B is blended with 0.2% of nano alumina powder in weight and the blend is heated at 750° C. for 5 hours in a dry air atmosphere. The obtained product is blended with 0.2% of nano alumina powder and 3% of PVDF powder (Kynar Flex) in weight and the blend is heated at 375° C. for 5 hours in a dry air atmosphere and named EX1-1-BC.

4) EX1-1-CC, which is the Compound C, is obtained by a simple mixing between EX1-1-AC (55% in weight) and EX1-1-BC (45% in weight). EX1-1-C is obtained by a simple mixing between EX1-1-A (55% in weight) and EX1-1-B (45% in weight).

TABLE 1-2

Schematic chart of the process for Example 1-1

| Flow ID/Product IN | | Process name | Flow ID/Product OUT | |
|---|---|---|---|---|
| 1) Precursor precipitation ||||| 
| R1.1 | M'SO$_4$ solution | P1.1 Precipitation reaction | F1.1 | Slurry |
| R1.2 | NH$_4$OH solution | | | |
| R1.3 | NaOH solution | | | |
| F1.1 | Slurry | P1.2 Separation (e.g. filtering) | F1.2 F1.3 | Filter cake Waste solution |
| F1.2 | Filter cake | P1.3 Washing and drying | EX1-1-MBP | Metal bearing precursor |
| 2) Fractionation ||||| 
| EX1-1-MBP | Metal bearing precursor | P2.1 1st Fractionation | EX1-1-B1' EX1-1-MBP-RC | Coarse fraction Remaining fraction |
| EX1-1-MBP-RC | Remaining fraction | P2.2 2nd fractionation | EX1-1-B1 EX1-1-A1 | Fine fraction Narrow span metal bearing precursor |
| 3) Lithiation ||||| 
| EX1-1-A1 | Narrow span metal bearing precursor | P3.1 1st sintering for core | F3.1 | Li deficient N(M)C core |
| F3.1 | Li deficient N(M)C core | P3.2 2nd sintering for core | EX1-1-A | Narrow span polycrystalline N(M)C core |
| EX1-1-A | Narrow span polycrystalline N(M)C core | P3.3 Surface coating | EX1-1-AC | Coated Narrow span polycrystalline N(M)C core |
| EX1-1-B1' EX1-1-B1 | Coarse fraction Fine fraction | P3.4 1$^{st}$ sintering for filler | F3.3 | Li deficient N(M)C filler |
| F3.3 | Li deficient N(M)C filler | P3.5 2$^{nd}$ sintering for filler | EX1-1-B | Monolithic N(M)C filler |
| EX1-1-B | Monolithic N(M)C filler | P3.6 Surface coating | EX1-1-BC | Coated monolithic N(M)C filler |
| 4) Mixing ||||| 
| EX1-1-AC EX1-1-BC | Coated Narrow span polycrystalline N(M)C core Coated monolithic N(M)C filler | P4.1 Mixing | EX1-1-CC | Coated high density N(M)C |
| EX1-1-A EX1-1-B | Narrow span polycrystalline N(M)C core Monolithic N(M)C filler | P4.1' Mixing | EX1-1-C | High density N(M)C |

Comparative Example 1-1

The positive electrode material CEX1-1, having a formula of LiNi$_{0.625}$Mn$_{0.175}$Co$_{0.200}$O$_2$, is prepared by following procedure. To obtain lithium deficient sintered precursor, LiOH.H$_2$O and EX1-1-MBP are homogenously blended with Li/M' ratio of 0.85. The first blend is sintered at 800° C. for 10 hours an oxygen atmosphere in a chamber furnace. After the 1$^{st}$ sintering, the sintered cake is crushed, classified and sieved to powder which is a lithium deficient sintered precursor. The lithium deficient sintered precursor is blended with LiOH.H$_2$O in order to correct the Li stoichiometry to Li/M'=1.00. The blend from the 2$^{nd}$ blending is sintered at 840° C. for 10 hours in a dry air atmosphere in a chamber furnace. The 2$^{nd}$ sintered product is grinded and sieved to avoid the formation of agglomerates and named CEX1-1.

A surface modified compound, CEX1-1C, having a general formula of Li((Ni$_{0.625}$Mn$_{0.175}$Co$_{0.200}$)$_{1-d}$E$_d$)O$_2$ with E being Al and F wherein 0≤d≤0.05, is prepared by following procedure. CEX1-1 is blended with 0.2% of nano alumina powder in weight and the blend is heated at 750° C. for 5 hours in a dry air atmosphere. The obtained product is blended with 0.2% of nano alumina powder and 3% of PVDF powder (Kynar Flex) in weight and the blend is heated at 375° C. for 5 hours in a dry air atmosphere and named CEX1-1C.

Example 1-2

The positive electrode material EX1-2-C, having a formula of LiNi$_{0.9}$Co$_{0.1}$O$_2$, is prepared by following procedure.

1) A metal bearing precursor EX1-2-MBP is prepared by a same procedure like EX1-1-MBP except that a feed of metal sulfate solution (2 mol/L M'SO$_4$, wherein M'=Ni$_{0.90}$Co$_{0.10}$) is used.

2) EX1-2-MBP is classified into three metal bearing precursors which have different particle size by a fractionation technique. The fractionation is done using a "CLASSIEL N-5" type of air separator device. The air flow is 5~8 m$^3$ per a minute and the RPM is 9000. 50 kg of EX1-2-MBP is injected into the equipment. 7.5 kg of coarse fraction (15% of total amount) is classified during the 1$^{st}$ fractionation (P2.1) and named EX1-2-B1'. The remaining 42.5 kg of powder is named EX1-2-MBP-RC. 15 kg of fine fraction (30% of total amount) in EX1-2-MBP-RC is classified during the 2$^{nd}$ fractionation (P2.2) and named EX1-2-B1. The remaining 27.5 kg of power (55% of total amount) is named EX1-2-A1.

3-A) EX1-2-A is obtained through a single sintering process. LiOH and EX1-2-A1 are homogenously blended with Li/M' ratio of 1.00. The blend is sintered at 725° C. for 10 hours an oxygen atmosphere in a furnace. The sintered product is grinded and sieved to avoid the formation of agglomerates and named EX1-2-A.

3-B) EX1-2-B is obtained through a double sintering process. To obtain lithium deficient sintered precursor, LiOH and EX1-1-B1 are homogenously blended with Li/M' ratio of 0.70. The first blend is sintered at 700° C. for 10 hours in an oxygen atmosphere in a tube furnace. After the 1$^{st}$ sintering, the sintered cake is crushed, classified and sieved to powder which is a lithium deficient sintered precursor. The lithium deficient sintered precursor is blended with LiOH.H$_2$O in order to correct the Li stoichiometry to Li/M'=1.00. The blend from the 2$^{nd}$ blending is sintered at 820° C. for 10 hours in an oxygen atmosphere in a tube furnace (P3.5). To separate the primary particles from the sintered agglomerated particles, 50 g of obtained sintered agglomerated particles and 50 ml of water are put on a 250 ml bottle which is filled with 10 mm zirconia balls (25% volume of the bottle). The ball milling is proceeded with 50 RPM for 15 hours. The diameter of the bottle and the ball mill roller are both 6 cm. The obtained milled compound is filtered and dried at 150° C. for 5 hours. The dried compound is heated at 700° C. for 5 hours in an oxygen atmosphere and named EX1-2-B.

3-B') 0.5 g of EX1-2-B1' which is a fractionized coarse fraction is put in a beaker containing 50 ml of 2 mol/L H$_2$SO$_4$ solution. 2 ml of H$_2$O$_2$ is added in the beaker and the slurry is stirred by a magnetic bar at a room temperature for 3 hours. It is observed that the EX1-2-B1' powder is completely reacted with the sulfuric acid and transparent M'SO$_4$ solution is formed. The M'SO$_4$ can be used for the precipitation process as a raw material (P1.1) after a concentrating process.

4) EX1-2-C is obtained by a simple mixing between EX1-2-A (65% in weight) and EX1-2-B (35% in weight).

Comparative Example 1-2

The positive electrode material CEX1-2, having a formula of LiNi$_{0.9}$Co$_{0.1}$O$_2$, is prepared by following procedure. LiOH and EX1-2-MBP are homogenously blended with Li/M' ratio of 1.00. The blend is sintered at 725° C. for 10 hours an oxygen atmosphere in a tube furnace. The sintered cake is crushed, classified and sieved and named CEX1-2.

TABLE 1-3

PSD of metal bearing precursors before and after fractionation processes in Example 1-1

| Sample ID | Amount (wt %) | D50 (μm) | span |
|---|---|---|---|
| EX1-1-MBP | — | 12.2 | 1.36 |
| EX1-1-B1' | 15 | 23.8 | 0.77 |
| EX1-1-A1 | 55 | 13.8 | 0.74 |
| EX1-1-B1 | 30 | 6.8 | 0.91 |

Figures 1, 2:
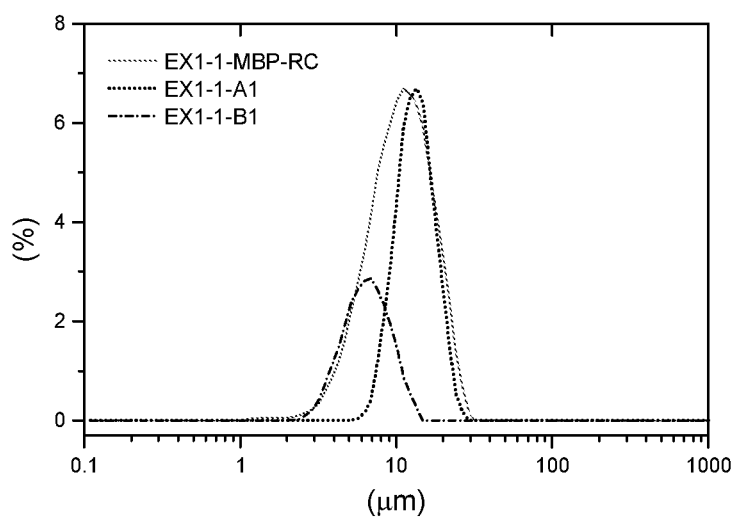

Table 1-3, FIG. 1-1, and FIG. 1-2 show the PSD before and after fractionation processes in Example 1-1. In the 1$^{st}$ fractionation process, EX1-1-MBP is classified into two metal bearing precursors, EX1-1-MBP-RC and EX1-1-B1', which have different PSD. In the 2$^{nd}$ fractionation process, EX1-1-MBP-RC is classified into again two metal bearing precursors, EX1-1-A1 and EX1-1-B1. Since EX1-1-A1 has a narrow span, it can be used as a precursor of Compound A.

TABLE 1-4

PSD, PD, ID10, and DQ1 of positive electrode materials in Example 1-1 and comparative example 1-1

| Sample ID | D50 (μm) | span | PD (g/cm$^3$) | ID10 (%) | DQ1 (mAh/cm$^3$) |
|---|---|---|---|---|---|
| EX1-1-A | 12.5 | 0.87 | 3.29 | −20 | 590.3 |
| EX1-1-B | 3.5 | 1.14 | 3.15 | −4 | 522.3 |
| EX1-1-C | | | 3.47 | −5 | 609.4 |
| EX1-1-AC | 12.3 | 0.89 | 3.43 | −25 | 616.0 |
| EX1-1-BC | 4.0 | 1.09 | 3.20 | −6 | 550.3 |
| EX1-1-CC | | | 3.55 | −5 | 630.9 |
| CEX1-1 | 11.3 | 1.43 | 3.32 | −33 | 606.2 |

FIG. 1-3 and FIG. 1-4 show FE-SEM images of EX1-1-A and EX1-1-B, respectively. EX1-1-A comprises relatively regular polycrystalline particles due to the narrow span of its metal bearing precursor (EX1-1-A1). EX1-1-B comprises relatively small and monolithic (single crystalline) particles. The morphology of EX1-1-AC and EX1-1-BC should be same as that of EX1-1-A and EX1-1-B. Table 1-4 shows the physical and electrochemical properties of positive electrode materials in Example 1-1 and Comparative Example 1-1. It is observed that un-coated mixture (EX1-1-C) as well as coated mixture (EX1-1-CC) have higher volumetric capacity (DQ1) than CEX1-1. Additionally, EX1-1-C and EX1-

1-CC have higher ID10 than CEX1-1, meaning that the compressive particle strength of EX1-1-C and EX1-1-CC is high. FIG. 1-5 shows the full cell analysis result of EX1-1-CC and CEX1-1C at 4.35V. EX1-1-CC has much better cycle stability than CEX1-1C due to its high compressive particle strength.

TABLE 1-5

PSD of metal bearing precursors before and after fractionation processes in Example 1-2

| Sample ID | Amount (wt %) | D50 (μm) | span |
|---|---|---|---|
| EX1-2-MBP | — | 13.2 | 1.33 |
| EX1-2-B1' | 15 | 21.5 | 0.82 |
| EX1-2-A1 | 55 | 14.0 | 0.77 |
| EX1-2-B1 | 30 | 7.5 | 0.64 |

Table 1-5 shows PSD before and after fractionation processes in Example 1-2. In spite of a very high Ni content of EX1-2-MBP, the fractionation yields metal bearing precursors which have proper PSDs.

TABLE 1-6

PSD, PD, and DQ1 of positive electrode materials in Example 1-2 and comparative example 1-2

| Sample ID | D50 (μm) | Span | PD (g/cm$^3$) | DQ1 (mAh/cm$^3$) |
|---|---|---|---|---|
| EX1-2-A | 13.1 | 0.65 | 3.39 | 658.6 |
| EX1-2-B | 3.8 | 1.17 | 3.49 | 678.8 |
| EX1-2-C | | | 3.93 | 768.0 |
| CEX1-2 | 12.1 | 1.29 | 3.62 | 714.8 |

Table 1-6 and FIG. 1-6 show the physical and electrochemical property of positive electrode materials in Example 1-2 and Comparative Example 1-2. EX1-2-C is superior to CEX1-2.

2. EXAMPLES ACCORDING TO THE SECOND METHOD OF MANUFACTURING THE N(M)C CATHODE MATERIAL ACCORDING TO THE INVENTION

Example 2-1

The positive electrode material EX2-1-C having a formula of $LiNi_{0.60}Mn_{0.20}Co_{0.20}O_2$ is prepared by following procedure. Table 2-2 shows the overview of the process in Example 2-1.

1) A metal bearing precursor is obtained by a precipitation (P1.1) in a pilot line. The process uses a larger-scale (about 100 L) CSTR. A feed of metal sulfate solution (2 mol/L M'SO$_4$, wherein M'=$Ni_{0.60}Mn_{0.20}Co_{0.20}$) and a feed of sodium hydroxide solution (10 mol/L NaOH) are supplied to the reactor. Additionally, a flow of NH$_4$OH solution (15 mol/L) is added as a complexing agent. The residence time—being the reactor volume divided by total flow rate—is 3 hours, and the temperature is set at 60° C. A protective atmosphere of N$_2$ is recommended to keep the level of impurities low. The collected precipitated metal bearing precursor slurry is filtered and washed by de-ionized water, and then dried at 150° C. for 24 hours under N$_2$ atmosphere, obtaining the mixed metal bearing precursor M'O$_{0.17}$-(OH)$_{1.83}$ with metal composition M'=$Ni_{0.60}Mn_{0.20}Co_{0.20}$. It is named EX2-1-MBP.

2) A lithium deficient intermediate compound is obtained by the 1$^{st}$ sintering step (P2.1). EX2-1-MBP and Li$_2$CO$_3$ are homogeneously blended with Li/M' ratio of 0.70. The blend is sintered at 760° C. in a rotary kiln with a residence time of an hour and named EX2-1-LDI.

3) EX2-1-LDI is classified into three LDI compounds which have different particle size by a fractionation technique. The fractionation is done using a "CLASSIEL N-5" air separator device. The air flow is 5~8 m$^3$ per a minute and the RPM is 9000. 50 kg of EX2-1-LDI is injected into the equipment. 5.0 kg of coarse fraction (10% of total amount) is classified during the 1$^{st}$ fractionation (P3.1) and named EX2-1-LDI-B1'. The remaining 45.0 kg of powder is named EX2-1-LDI-RC. 12.5 kg of fine fraction (25% of total amount) in EX2-1-LDI-RC is classified during the 2$^{nd}$ fractionation (P3.2) and named EX2-1-LDI-B1. The remaining 32.5 kg of power (65% of total amount) is named EX2-1-LDI-A1.

4-A) EX2-1-A is obtained through the 2$^{nd}$ sintering step. EX2-1-LDI-A1 is blended with LiOH.H$_2$O in order to correct the Li stoichiometry to Li/M'=1.00. The blend is sintered at 855° C. for 10 hours in a dry air atmosphere in a furnace (P4.1). The 2$^{nd}$ sintered product is grinded and sieved to avoid the formation of agglomerates and named EX2-1-A.

4-B) EX2-1-B is also obtained through the 2$^{nd}$ sintering step. EX2-1-LDI-B1' and EX2-1-LDI-B1 are blended with LiOH.H$_2$O in order to correct the Li stoichiometry to Li/M'=1.02. The blend is sintered at 920° C. for 10 hours in a dry air atmosphere in a furnace (P4.2). To separate the primary particles from the sintered agglomerated particles, 50 g of obtained sintered agglomerated particles and 50 ml of water are put on a 250 ml bottle which is filled with 10 mm zirconia balls (25% volume of the bottle). The ball milling is proceeded with 50 RPM for 15 hours. The diameter of the bottle and the ball mill roller are both 6 cm. The obtained milled compound is filtered and dried at 150° C. for 5 hours. The dried compound is heated at 750° C. for 10 hours in a dry air atmosphere in a furnace and named EX2-1-B.

5) EX2-1-C, which is the Compound C, is obtained by a simple mixing between EX2-1-A (65% in weight) and EX2-1-B (35% in weight).

TABLE 2-2

Schematic chart of the process for Example 2-1

| Flow ID/Product IN | | Process name | | Flow ID/Product OUT | |
|---|---|---|---|---|---|
| 1) Precursor precipitation | | | | | |
| R1.1 | M'SO$_4$ solution | P1.1 | Precipitation solution | F1.1 | Slurry reaction |
| R1.2 | NH$_4$OH | | | | |
| R1.3 | NaOH solution | | | | |

TABLE 2-2-continued

Schematic chart of the process for Example 2-1

| Flow ID/Product IN | | Process name | Flow ID/Product OUT | |
|---|---|---|---|---|
| F1.1 | Slurry | P1.2 Separation (e.g. filtering) | F1.2 F1.3 | Filter cake Waste solution |
| F1.2 | Filter cake | P1.3 Washing and drying 2) 1$^{st}$ sintering | EX2-1-MBP | Metal bearing precursor |
| EX2-1-MBP | Metal bearing precursor | P2.1 1st sintering 3) Fractionation | EX2-1-LDI | Lithium deficient intermediate |
| EX2-1-LDI | Lithium deficient intermediate | P3.1 1$^{st}$ fractionation | EX2-1-LDI-B1' EX2-1-LDI-RC | Coarse fraction Remaining fraction |
| EX2-1-LDI-RC | Remaining fraction | P3.2 2$^{nd}$ fractionation 4) 2$^{nd}$ sintering | EX2-1-LDI-B1 EX2-1-LDI-A1 | Fine fraction Narrow span LDI |
| EX2-1-LDI-A1 | Narrow span LDI | P4.1 2$^{nd}$ sintering for core | EX2-1-A | Narrow span polycrystalline N(M)C core |
| EX2-1-LDI-B1' EX2-1-LDI-B1 | Coarse fraction Fine fraction | P4.2 2$^{nd}$ sintering for filler 5) Mixing | EX2-1-B | Monolithic N(M)C filler |
| EX2-1-A | Narrow span polycrystalline N(M)C core | P5.1 Mixing | EX2-1-C | High density N(M)C |
| EX2-1-B | Monolithic N(M)C filler | | | |

Comparative Example 2-1

The positive electrode material CEX2-1, having a formula of $LiNi_{0.60}Mn_{0.20}Co_{0.20}O_2$, is prepared by following procedure. EX2-1-LDI is blended with $LiOH.H_2O$ in order to correct the Li stoichiometry to Li/M'=1.00. The blend is sintered at 855° C. for 10 hours in a dry air atmosphere in a chamber furnace. The sintered compound is grinded and sieved to avoid the formation of agglomerates and named CEX2-1.

Example 2-2

The positive electrode material EX2-2-C, having a formula of $LiNi_{0.80}Mn_{0.10}Co_{0.10}O_2$, is prepared by following procedure.

1) A metal bearing precursor EX2-2-MBP is prepared by a same procedure like EX2-1-MBP except that a feed of metal sulfate solution (2 mol/L M'SO4, wherein M'=$Ni_{0.80}Mn_{0.10}Co_{0.10}$) is used.

2) A lithium deficient intermediate compound is obtained by the 1$^{st}$ sintering step (P2.1). EX2-2-MBP and LiOH are homogeneously blended with Li/M' ratio of 0.80. The blend is sintered at 700° C. for 10 hours in an oxygen atmosphere in a furnace and named EX2-2-LDI.

3) EX2-2-LDI is classified into three LDI compounds which have different particle size by a fractionation technique. The fractionation is done using a "CLASSIEL N-5" type of air separator device. The air flow is 5~8 m$^3$ per a minute and the RPM is 9000. 50 kg of EX2-LDI is injected into the equipment. 10 kg of coarse fraction (20% of total amount) is classified during the 1$^{st}$ fractionation (P3.1) and named EX2-2-LDI-B1'. The remaining 40.0 kg of powder is named EX2-2-LDI-RC. 7.5 kg of fine fraction (15% of total amount) in EX2-2-LDI-RC is classified during the 2$^{nd}$ fractionation (P3.2) and named EX2-LDI-B1. The remaining 32.5 kg of power (65% of total amount) is named EX2-2-LDI-A1.

4-A) EX2-2-A is obtained through the 2$^{nd}$ sintering step. EX2-2-LDI-A1 is blended with LiOH in order to correct the Li stoichiometry to Li/M'=1.00. The blend is sintered at 800° C. for 10 hours in an oxygen atmosphere in a furnace (P4.1). The 2$^{nd}$ sintered product is grinded and sieved to avoid the formation of agglomerates and named EX2-2-A.

4-B) EX2-2-B is also obtained through the 2$^{nd}$ sintering step. EX2-2-LDI-B1' and EX2-2-LDI-B1 are blended with LiOH in order to correct the Li stoichiometry to Li/M'=1.02. The blend is sintered at 860° C. for 10 hours in an oxygen atmosphere in a tube furnace (P4.2). To separate the primary particles from the sintered agglomerated particles, 50 g of obtained sintered agglomerated particles and 50 ml of water are put on a 250 ml bottle which is filled with 10 mm zirconia balls (25% volume of the bottle). The ball milling is proceeded with 50 RPM for 15 hours. The diameter of the bottle and the ball mill roller are both 6 cm. The obtained milled compound is filtered and dried at 150° C. for 5 hours. The dried compound is heated at 750° C. for 10 hours in an oxygen atmosphere in a tube furnace and named EX2-2-B.

5) EX2-2-C, which is the Compound C, is obtained by a simple mixing between EX2-2-A (65% in weight) and EX2-2-B (35% in weight).

Comparative Example 2-2

The positive electrode material CEX2-2, having a formula of $LiNi_{0.80}Mn_{0.10}Co_{0.10}O_2$, is prepared by following procedure. EX2-2-LDI is blended with LiOH in order to correct the Li stoichiometry to Li/M'=1.00. The blend is sintered at 800° C. for 10 hours in an oxygen atmosphere in a furnace. The sintered compound is grinded and sieved to avoid the formation of agglomerates and named CEX2-2.

TABLE 2-3

PSD of metal bearing precursor and LDI compounds before and after fractionation processes in Example 2-1

| Sample ID | D50 (μm) | SPAN |
|---|---|---|
| EX2-1-MBP | 12.0 | 1.34 |
| EX2-1-LDI | 11.0 | 1.32 |
| EX2-1-LDI-B1' | 19.5 | 1.03 |
| EX2-1-LDI-A1 | 12.8 | 0.72 |
| EX2-1-LDI-B1 | 6.2 | 0.88 |

Table 2-3 and FIG. 2-1 show the PSD of the metal bearing precursor and LDI compounds before and after fractionation processes in Example 2-1. EX2-1-LDI has a similar PSD with EX2-1-MBP. The $1^{st}$ fractionation and $2^{nd}$ fractionation result in three LDIs which have different PSD.

TABLE 2-4

PSD, PD, ID10, and DQ1 of positive electrode materials in Example 2-1 and comparative example 2-1

| Sample ID | D50 (μm) | SPAN | PD (g/cm³) | ID10 (%) | DQ1 (mAh/cm³) |
|---|---|---|---|---|---|
| EX2-1-A | 12.7 | 0.84 | 3.35 | −30 | 591.3 |
| EX2-1-B | 3.8 | 1.10 | 3.26 | −3 | 546.4 |
| EX2-1-C | | | 3.54 | −7 | 619.2 |
| CEX2-1 | 12.9 | 1.40 | 3.37 | −45 | 587.3 |

Figures 1, 2, 3:
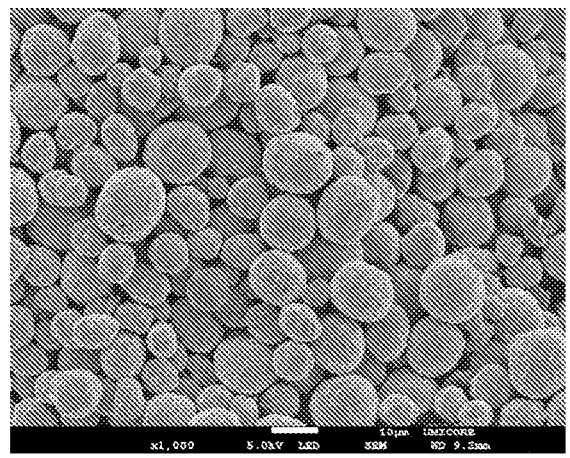
Figures 1, 2, 3, 4:
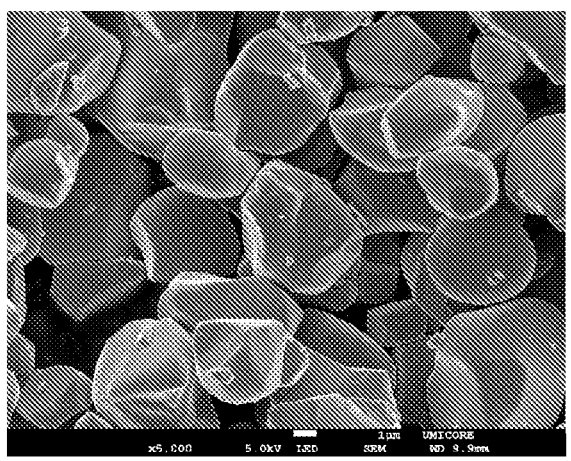
Figures 1, 2, 3, 4, 5:
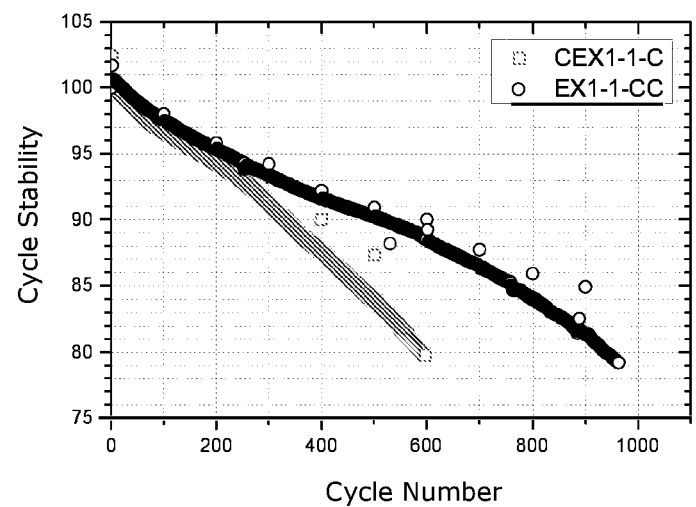
Figures 1, 2, 3, 4, 5, 6:
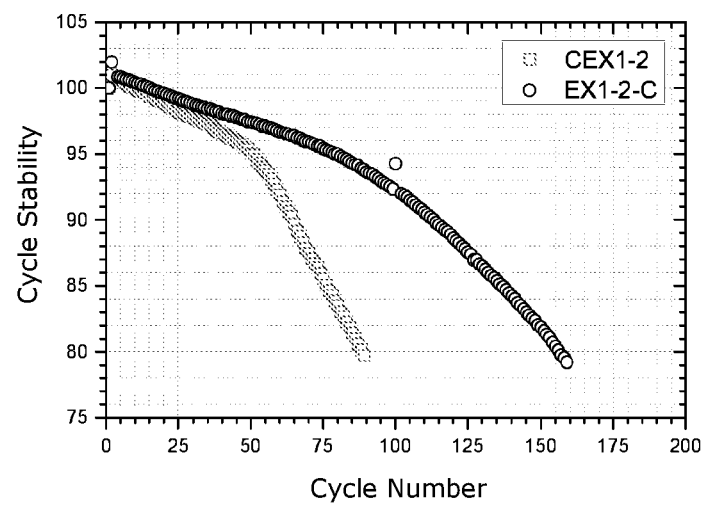
Figures 1, 2:
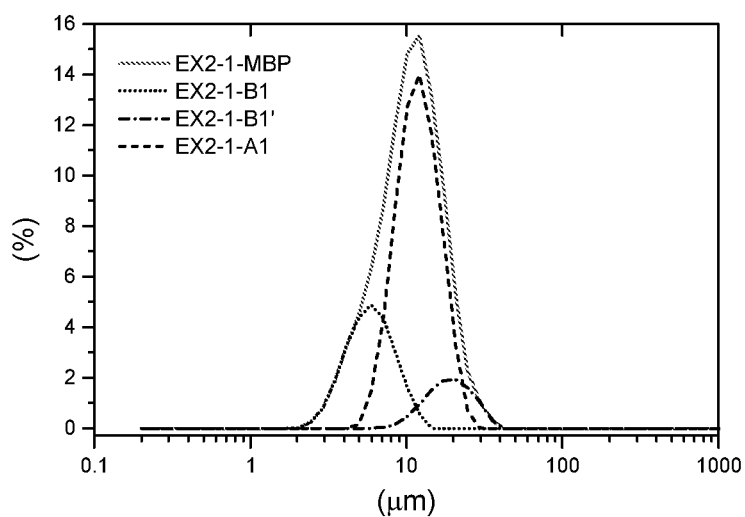
Figure 2:
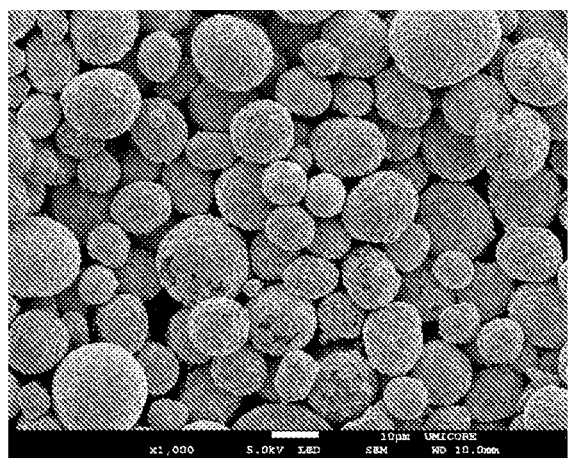
Figures 2, 3:
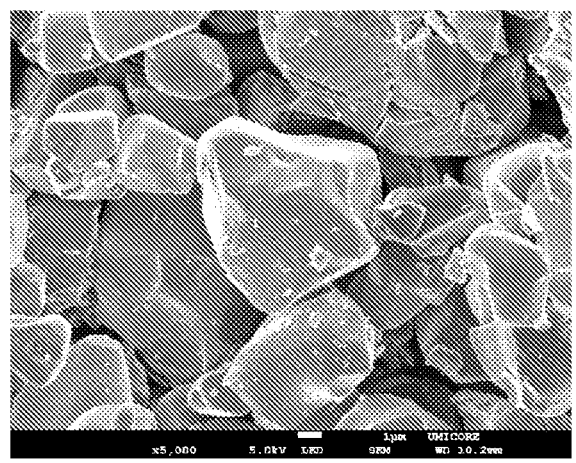

FIG. 2-2 and FIG. 2-3 show FE-SEM images of EX2-1-A and EX2-1-B, respectively. EX2-1-A comprises relatively regular polycrystalline particles due to the narrow span of its LDI (EX2-1-LDI-A1). EX2-1-B comprises relatively small and monolithic (single crystalline) particles. Table 2-4 shows the physical and electrochemical properties of positive electrode materials in Example 2-1 and Comparative Example 2-1. It is observed that EX2-1-C has higher DQ1 than CEX2-1. Also, EX2-1-C has higher ID10 than CEX2-1, meaning that the compressive particle strength of EX2-1-C is higher.

TABLE 2-5

PSD of metal bearing precursor and LDI compounds before and after fractionation processes in Example 2-2

| Sample ID | D50 (μm) | SPAN |
|---|---|---|
| EX2-2-MBP | 15.9 | 1.21 |
| EX2-2-LDI | 15.2 | 1.21 |
| EX2-2-LDI-B1' | 27.3 | 0.51 |
| EX2-2-LDI-A1 | 15.6 | 0.73 |
| EX2-2-LDI-B1 | 7.9 | 0.84 |

Table 2-5 shows PSD of metal bearing precursor and LDI compounds before and after fractionation processes in Example 2-2. In spite of a very high Ni content of EX2-2-MBP, PSD of EX2-2-MBP is preserved in EX2-2-LDI and the fractionation of EX2-2-LDI yields LDI compounds which have proper PSDs.

TABLE 2-6

PSD, PD, and DQ1 of positive electrode materials in Example 2-2 and comparative example 2-2

| Sample ID | D50 (μm) | SPAN | PD (g/cm³) | DQ1 (mAh/cm³) |
|---|---|---|---|---|
| EX2-2-A | 15.1 | 0.76 | 3.61 | 702.0 |
| EX2-2-B | 3.1 | 1.13 | 3.23 | 623.2 |
| EX2-2-C | | | 3.74 | 707.1 |
| CEX2-2 | 14.4 | 1.20 | 3.55 | 669.4 |

Table 2-6 shows the physical and electrochemical property of positive electrode materials in Example 2-2 and Comparative Example 2-2. EX2-2-C is superior to CEX2-2.

Explanatory Example 1

This example illustrates that the Compound C consisting of a proper Compound A and Compound B has a benefit of less increase of surface area after pressing.

A polycrystalline Compound A, EEX1-A, having a general formula of $Li_{1.01}(Ni_{0.625}Mn_{0.175}Co_{0.200})_{0.99}O_2$ is prepared by following steps:

1) Precipitation: The MBP which has a narrow span PSD is prepared using a continuous stirred tank reactor (CSTR) precipitation technique with manual back-feeding. The temperature of the CSTR is fixed at 60° C. A 2M M'SO$_4$ solution (M'=$Ni_{0.625}Mn_{0.175}Co_{0.200}$), 10M NaOH solution, and 12M NH$_4$OH solution with a flow rate of 2 L/hour, 0.9 L/hour, and 0.4 L/hour respectively, are continuously fed into a 10 L reactor with a residence time of 3 hours. The CSTR is continuously stirred through an impeller at 1000 RPM. The precursor slurry is collected through an overflow at each hour. The collected precursor slurry is settled down and 2.8 L of clear mother-liquor is dumped. The remaining 0.5 L thick slurry is manually back-fed into the CSTR at each hour. During this procedure, the PSD of the precursor inside the CSTR is measured. When the D50-particle size of the precursor reaches 11 μm, each time 5 L of precursor slurry is collected. The collected precursor slurry is filtered and washed by de-ionized water, and then dried at 150° C. for 20 hours under N$_2$ atmosphere, obtaining the MBP ($Ni_{0.625}Mn_{0.175}Co_{0.200}O_{0.29}(OH)_{1.71}$).

2) $1^{st}$ blending: to obtain a lithium deficient intermediate product, Li$_2$CO$_3$ and the MBP are homogenously blended with a Li/M' ratio of 0.85, in a mixer for 30 minutes.

3) $1^{st}$ sintering: the blend from the $1^{st}$ blending step is sintered at 890° C. for 12 hours in an oxygen containing atmosphere in a furnace. After the $1^{st}$ sintering, the sintered cake is crushed, classified and sieved to powder so as to prepare it for the $2^{nd}$ blending step. The product obtained from this step is a lithium deficient intermediate product, meaning that the Li/M' stoichiometric ratio in LiM'O$_2$ is less than 1.

4) $2^{nd}$ blending: the lithium deficient intermediate product is blended with LiOH.H$_2$O in order to correct the Li stoichiometry to Li/M'=1.02. The blending is performed in a mixer for 30 minutes.

5) $2^{nd}$ sintering: the blend from the $2^{nd}$ blending is sintered at 840° C. for 10 hours in an oxygen containing atmosphere in a furnace.

6) Post-treatment: the $2^{nd}$ sintered product is grinded and sieved to avoid the formation of agglomerates. The final product is $Li_{1.01}(Ni_{0.625}Mn_{0.175}Co_{0.200})O_2$ and labelled as EEX1-A.

A monolithic Compound B, EEX1-B, having a general formula of $Li_{1.01}(Ni_{0.625}Mn_{0.175}Co_{0.200})_{0.99}O_2$ is prepared a double sintering process which is a solid state reaction of a lithium source, $Li_2CO_3$ or LiOH, and a MBP prepared by the process described in KR101547972B1, of which composition is $Ni_{0.625}Mn_{0.175}Co_{0.200}O_{0.43}(OH)_{1.57}$. The MBP has a D50 of around 4 μm. The process includes two separate sintering steps and runs as follows:

1) $1^{st}$ blending: to obtain a lithium deficient intermediate precursor, $LiOH.H_2O$ and the MBP are homogenously blended with a Li/N' ratio of 0.90 in a mixer for 30 minutes.

2) $1^{st}$ sintering: the blend from the $1^{st}$ blending step is sintered at 750° C. for 12 hours under $O_2$ atmosphere in a chamber furnace. The product obtained from this step is a powderous lithium deficient intermediate product with Li/N'=0.90.

3) $2^{nd}$ blending: the lithium deficient intermediate product is blended with $LiOH.H_2O$ in order to correct the Li stoichiometry (Li/N'=1.02). The blending is performed in a mixer for 30 minutes.

4) $2^{nd}$ sintering: the blend from the $2^{nd}$ blending is sintered at 930° C. for 10 hours in an oxygen containing atmosphere in a chamber furnace.

5) Post-treatment: To separate the primary particles from the $2^{nd}$ sintered agglomerated particles, 50 g of obtained sintered agglomerated particles and 50 ml of water are put on a 250 ml bottle which is filled with 10 mm zirconia balls (25% volume of the bottle). The ball milling is proceeded with 50 RPM for 15 hours. The diameter of the bottle and the ball mill roller are both 6 cm. The obtained milled compound is filtered, dried at 150° C. for 5 hours, and named EEX1-B.

CEEX1-B is a commercial polycrystalline NMC product from Umicore having a composition of $Li_{1.03}(Ni_{0.38}Mn_{0.29}Co_{0.33})_{0.97}O_2$. It is obtained using the MBP produced by a typical CSTR precipitation process and standard single solid-state reaction between $Li_2CO_3$ and MBP in an oxygen containing atmosphere.

Compound C samples are prepared by mixing Compound A and Compound B according to Table 5.

TABLE 4

PSD, PD, and IB of Compound A and B in Explanatory Example 1

| Sample ID | Morphology | D50 (μm) | SPAN | PD (g/cm³) | IB (%) |
|---|---|---|---|---|---|
| EEX1-A | Polycrystalline | 11.0 | 0.6 | 3.10 | 22 |
| EEX1-B | Monolithic | 3.3 | 1.2 | 3.23 | 14 |
| CEEX1-B | Polycrystalline | 2.9 | 1.1 | 3.05 | 42 |

TABLE 5

PD and IB of Compound C in Explanatory Example 1

| Compound C | Compound A | Compound B | Fraction A/(A + B) (wt. %) | PD (g/cm³) | IB (%) |
|---|---|---|---|---|---|
| EEX1-C1 | EEX1-A | EEX1-B | 80 | 3.43 | 3.2 |
| EEX1-C2 | EEX1-A | EEX1-B | 60 | 3.48 | -2.3 |
| EEX1-C3 | EEX1-A | EEX1-B | 40 | 3.42 | 2.0 |
| CEEX1-C1 | EEX1-A | CEEX1-B | 80 | 3.37 | 28.2 |
| CEEX1-C2 | EEX1-A | CEEX1-B | 60 | 3.43 | 61.0 |
| CEEX1-C3 | EEX1-A | CEEX1-B | 50 | 3.35 | 46.0 |

Table 4 shows PSD, PD, and IB of EEX1-A, EEX1-B, and CEEX1-B. EEX1-B and CEEX1-B have similar PSD but different morphology.

Table 5 shows the mixing ratio of A, PD, and IB of Compound C samples in Explanatory Example 1. CEEX1-C1, CEEX1-C2, and CEEX1-C3 can be considered as prior art products which are mixtures of polycrystalline materials having different particle size. It is observed that EEX1-C1~C3, which comprises EEX1-B (monolithic Compound B), have much less IB (BET increase after pressing) than CEEX1-C1~C3.

The invention claimed is:

1. A method for preparing a powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_cMe'_dCo_eK_f$, wherein $0.30 \leq c \leq 0.92$, $0.00 \leq d \leq 0.40$, $0.05 \leq e \leq 0.40$ and $0 \leq f \leq 0.05$, with Me' being either one or both of Mn or Al, and with K being a dopant different from Me', the method comprising the steps of:

providing a Ni— and Co— bearing precursor of said powderous positive electrode active material, fractionating said Ni— and Co— bearing precursor so as to obtain a first fraction of precursor particles having a span inferior to 1.0 and having a D50 superior or equal to 10 μm and inferior or equal to 20 μm, and at least one second fraction of precursor particles, said first fraction and at least one second fraction of precursor particles being split off from said Ni— and Co— bearing precursor, said first fraction being at least 40 wt % and at most 85 wt % with respect to the total weight of the Ni— and Co— bearing precursor, said fractionating step being followed by the steps of:

converting said first fraction of precursor particles into a first compound powder comprising polycrystalline particles having a general formula $Li_{1+a}M'_{1-a}O_2$, wherein $-0.03 \leq a \leq 0.10$, and $M'=Ni_xM''_yCo_zE_d$, wherein $0.30 \leq x \leq 0.92$, $0.00 \leq y \leq 0.40$, $0.05 \leq z \leq 0.40$ and $0 \leq d \leq 0.05$, with M" being either one or both of Mn or Al, and with E being a dopant different from M", said first compound particles having a span inferior to 1.0 and having a D50 superior or equal to 10 μm and inferior or equal to 20 μm, converting said at least one second fraction of precursor particles into a second compound powder comprising single crystal monolithic particles having a general formula $Li_{1+b}N'_{1-b}O_2$, wherein $-0.03 \leq b \leq 0.10$, and $N'=Ni_{x'}N''_{y'}Co_{z'}E'_{d'}$, wherein $0.30 \leq x' \leq 0.92$, $0.00 \leq y' \leq 0.40$, $0.05 \leq z' \leq 0.40$ and $0 \leq d' \leq 0.05$, with N" being either one or both of Mn or Al, and with E' being a dopant different from N", said monolithic particles having a D50 superior or equal to 2 μm and inferior or equal to 8 μm, and mixing said first compound powder and said second compound powder so as to form the powderous positive electrode active material, wherein the content of the second compound is superior or equal to 15 wt % and inferior or equal to 60 wt % with respect to the total weight of the powderous positive electrode active material, and wherein the content of the first compound is superior or equal to 40 wt % and inferior or equal to 85 wt % with respect to the total weight of the powderous positive electrode active material.

2. The method according to claim 1, wherein said Ni— and Co— bearing precursor is fractioned so as to obtain one second fraction of precursor particles having a D50 superior to the D50 of the first fraction of precursor particles.

3. The method according to claim 1, wherein said at least one second fraction of Ni— and Co— bearing precursor particles is further fractionated into at least two sub-fractions, each of the at least two sub-fractions having a D50 superior to the D50 of the first fraction of precursor particles.

4. The method according to claim 1, wherein said Ni— and Co— bearing precursor has particles having a D50 superior or equal to 8 μm and inferior or equal to 25 μm.

5. The method according to claim 1, wherein the step of converting said at least one second fraction comprising said Ni— and Co— bearing precursor particles into said second compound comprises the steps of:
  providing a mixture comprising said at least one second fraction of Ni— and Co— bearing precursor particles and a Li bearing precursor,
  subjecting the mixture to a multiple step sintering process whereby in the final sintering step a sintered lithiated intermediate material is obtained comprising agglomerated primary particles having a primary particle size distribution with a D50 between 2.0 and 8.0 μm,
  subjecting the lithiated intermediate material to a wet-milling step whereby the agglomerated primary particles are deagglomerated and a slurry comprising deagglomerated primary particles is obtained,
  separating the deagglomerated primary particles from the slurry, and preferably
  drying the deagglomerated primary particles.

6. A method for preparing a powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_c Me'_d Co_e K_f$, wherein $0.30 \leq c \leq 0.92$, $0.00 \leq d \leq 0.40$, $0.05 \leq e \leq 0.40$ and $0 \leq f \leq 0.05$, with Me' being either one or both of Mn or Al, and with K being a dopant different from Me', the method comprising the steps of:
  providing a Ni— and Co— bearing precursor of said powderous positive electrode active materials,
  mixing said Ni— and Co— bearing precursor with a first Li bearing precursor so as to obtain a first mixture having a Li/M' molar ratio superior or equal to 0.70 and inferior or equal to 0.95, wherein M' comprises at least Co and Ni, and sintering said first mixture at a temperature superior or equal to 700° C. and inferior or equal to 950° C., so as to obtain a lithium deficient intermediate compound powder,
  fractionating said lithium deficient intermediate compound powder so as to obtain a first fraction of lithium deficient intermediate compound particles having a span inferior to 1.0 and having a D50 superior or equal to 10 μm and inferior or equal to 20 μm, and at least one second fraction lithium deficient intermediate compound particles, said first fraction and at least one second fraction being split off from said lithium deficient intermediate compound powder, said fractionating step being followed by the steps of:
  converting said first fraction of lithium deficient intermediate compound particles into a first compound comprising polycrystalline particles having a general formula $Li_{1+a}M'_{1-a}O_2$, wherein $-0.03 \leq a \leq 0.10$, and $M'=Ni_x M''_y Co_z E_d$, wherein $0.30 \leq x \leq 0.92$, $0.00 \leq y \leq 0.40$, $0.05 \leq z \leq 0.40$ and $0 \leq d \leq 0.05$, with M" being either one or both of Mn or Al, and with E being a dopant different from M", said first compound particles having a span inferior to 1.0 and having a D50 superior or equal to 10 μm and inferior or equal to 20 μm,
  converting said at least one second fraction of lithium deficient intermediate compound into a second compound comprising single crystal monolithic particles having a general formula $Li_{1+b}N'_{1-b}O_2$, wherein $-0.03 \leq b \leq 0.10$, and $N'=Ni_{x'} N''_{y'} Co_{z'} E'_{d'}$, wherein $0.30 \leq x' \leq 0.92$, $0.00 \leq y' \leq 0.40$, $0.05 \leq z' \leq 0.40$ and $0 \leq d' \leq 0.05$, with N" being either one or both of Mn or Al, and with E' being a dopant different from N", said monolithic particles having a D50 superior or equal to 2 μm and inferior or equal to 8 μm, and
  mixing said first and second compounds so as to form the powderous positive electrode active material, wherein the content of the second compound is superior or equal to 15 wt % and inferior or equal to 65 wt % with respect to the total weight of the powderous positive electrode active material, and wherein the content of the first compound is superior or equal to 35 wt % and inferior or equal to 85 wt % with respect to the total weight the powderous positive electrode active material.

7. The method according to claim 6, wherein said lithium deficient intermediate compound powder is fractioned so as to obtain one second fraction of precursor particles having a D50 superior to the D50 of the first fraction of precursor particles.

8. The method according to claim 6, wherein said second fraction of lithium deficient intermediate compound powder is fractioned so as to obtain a least two sub-fractions of lithium deficient intermediate compound particles, each of the at least two sub-fractions of lithium deficient intermediate compound having a D50 superior to the D50 of the first fraction of lithium deficient intermediate compound particles.

9. The method according to claim 6, wherein the step of converting said at least one second fraction of lithium deficient intermediate compound particles into said second compound comprises the steps of:
  providing a mixture comprising said second fraction of lithium deficient intermediate compound particles and a Li bearing precursor,
  subjecting the mixture to a multiple step sintering process whereby in the final sintering step a sintered lithiated intermediate material is obtained comprising agglomerated primary particles having a primary particle size distribution with a D50 between 2.0 and 8.0 μm,
  subjecting the lithiated intermediate material to a wet-milling step whereby the agglomerated primary particles are deagglomerated and a slurry comprising deagglomerated primary particles is obtained,
  separating the deagglomerated primary particles from the slurry, and preferably
  drying the deagglomerated primary particles, whereby single crystal monolithic particles comprising Ni and Co are obtained.

10. The method according to claim 9, wherein the wet ball milling step is performed in a solution with the solvent in the solution being water.

11. The method according to claim 6, wherein said Ni— and Co— bearing precursor further comprises Mn.

12. The method according to claim 11, wherein M' further comprises Mn.

13. A powderous positive electrode active material for secondary lithium ion batteries, said powderous positive electrode active material comprising particles having a general formula $Li_{1+k}Me_{1-k}O_2$, wherein $-0.03 \leq k \leq 0.10$, and $Me=Ni_c Me'_d Co_e K_f$, wherein $0.30 \leq c \leq 0.92$ $0.00 \leq d \leq 0.40$, $0.05 \leq e \leq 0.40$ and $0 \leq f \leq 0.05$, with Me' being either one or both of Mn or Al, and with K being a dopant different from Me', said powderous material being a bimodal mixture of a first fraction of a first compound comprising polycrystalline particles having a general formula $Li_{1+a}M'_{1-a}O_2$, wherein −0.03≤a≤0.10, and M'=Ni$_x$M''$_y$Co$_z$E$_d$, wherein 0.30≤x≤0.92, 0.00≤y≤0.40, 0.05≤z≤0.40 and 0≤d≤0.05, with M'' being either one or both of Mn or Al, and with E being a dopant different from M'', said first compound particles having a span inferior to 1.0 and having a D50 superior or equal to 10 µm and inferior or equal to 20 µm, and a second fraction of a second compound comprising single crystal monolithic particles having a general formula Li$_{1+a}$M'$_{1-a}$O$_2$, wherein −0.03≤a≤0.10, and M'=Ni$_x$M''$_y$Co$_z$E$_d$, wherein 0.30≤x≤0.92, 0.00≤y≤0.40, 0.05≤z≤0.40 and 0≤d≤0.05, with M'' being either one or both of Mn or Al, and with E being a dopant different from M'', said monolithic particles having a D50 superior or equal to 2 µm and inferior or equal to 8 µm, wherein the content of the second fraction is superior or equal to 15 wt % and inferior or equal to 65 wt % with respect to the total weight of the powderous positive electrode active material, and wherein the content of the first fraction is superior or equal to 35 wt % and inferior or equal to 85 wt % with respect to the total weight the powderous positive electrode active material.

14. The powderous positive electrode active material of claim 13, wherein the content of the second fraction is superior or equal to 20 wt % and inferior or equal to 60 wt % with respect to the total weight of the powderous positive electrode active material.

\* \* \* \* \*